(12) United States Patent
Okada et al.

(10) Patent No.: US 6,528,754 B2
(45) Date of Patent: Mar. 4, 2003

(54) UNDERWATER MAINTENANCE REPAIR DEVICE AND METHOD

(75) Inventors: Satoshi Okada, Tokyo (JP); Hiroaki Igakura, Yokohama (JP); Motohiko Kimura, Yokohama (JP); Tatsuki Ogisu, Yokohama (JP); Yoshiaki Ono, Zushi (JP); Masaki Yoda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 09/926,656
(22) PCT Filed: Mar. 30, 2001
(86) PCT No.: PCT/JP01/02802
§ 371 (c)(1),
(2), (4) Date: Nov. 29, 2001
(87) PCT Pub. No.: WO01/73793
PCT Pub. Date: Oct. 4, 2001

(65) Prior Publication Data
US 2002/0134764 A1 Sep. 26, 2002

(30) Foreign Application Priority Data
Mar. 31, 2000 (JP) .......................................... 2000-99730

(51) Int. Cl.[7] .............................................. B23K 26/00
(52) U.S. Cl. .................................................. 219/121.6
(58) Field of Search ........................ 219/121.6, 121.63, 219/121.64, 121.65, 121.66, 121.67, 121.68, 121.69, 121.7, 121.71, 121.72

(56) References Cited

U.S. PATENT DOCUMENTS

| | | | |
|---|---|---|---|
| 5,790,620 A | | 8/1998 | Okazaki et al. |
| 5,977,515 A | * | 11/1999 | Uraki et al. |
| 6,084,202 A | * | 7/2000 | Okazaki et al. |
| 6,163,012 A | * | 12/2000 | Kimura et al. |

FOREIGN PATENT DOCUMENTS

| | | |
|---|---|---|
| JP | 8-201568 | 8/1996 |
| JP | 11-311692 | 11/1999 |

* cited by examiner

Primary Examiner—Samuel M. Heinrich
(74) Attorney, Agent, or Firm—Oblon, spivak, McClelland, Maier & Neustadt, P.C.

(57) ABSTRACT

The present invention provides an underwater maintenance and repair technology of including a laser oscillator for generating a laser beam and a working head movably attached to the vicinity of a working target portion in the underwater and adapted to scan the laser beam to the working target portion, and further, independently fixing the working head to the vicinity of the working target portion, jointing an optical fiber cable to the working head by using a joint mechanism through a remote control operation, guiding a laser beam emitted from a laser oscillator via the optical fiber cable, and irradiating the laser beam from the working head to a surface of the working target portion while scanning it so as to achieve surface modification, surface working and decontamination.

14 Claims, 16 Drawing Sheets

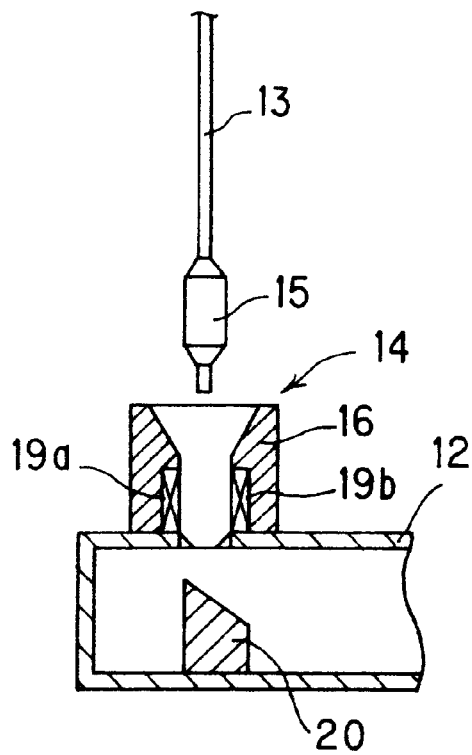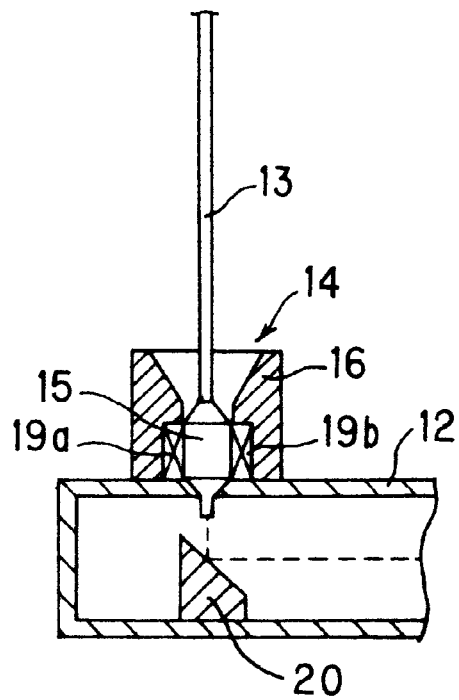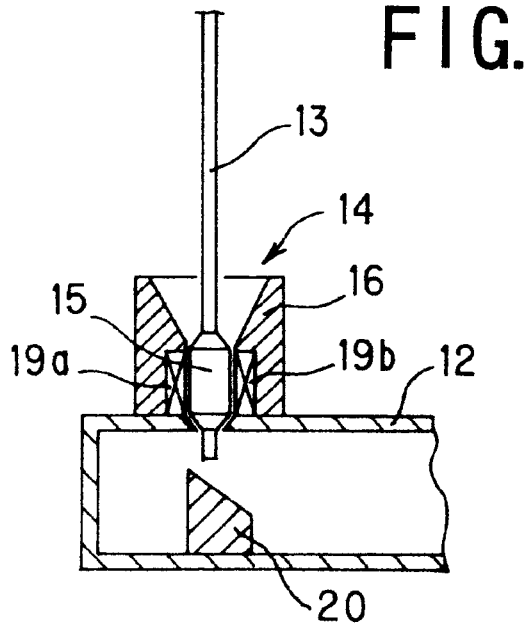
FIG. 2A
FIG. 2C
FIG. 2B

UNDERWATER MAINTENANCE REPAIR DEVICE AND METHOD

TECHNICAL FIELD

The present invention relates to a technology for maintaining and repairing a structure in an underwater, and for example, to an apparatus for preventably maintaining and repairing a reactor pressure vessel and an in-core or in-pile (herein, which may be referred to as "in-core" for the sake of convenience) structure in a nuclear power (generation) plant or the like. In particular, the present invention relates to underwater maintenance and repair apparatus and method, which can achieve stress improvement of surface layer in the vicinity of a weld line (seam), surface modification of sensitized metal fiber and achieve welding repair with respect to the following targets under the underwater environment such as cooling water of reactor pressure vessel. In this case, the stress improvement is carried out so as to change a residual tensile stress generated by heat influence in welding performance into a compression stress by a laser. Further, the above targets include a space partitioned by a shroud shell outer wall, which is an in-core structure, a baffle plate and a reactor pressure vessel inner wall, and a welded structure surface existing in a space surrounded by other in-core structures.

BACKGROUND ART

Conventionally, an in-core structure of a light water reactor, for example, a boiled water reactor has been composed of a material having sufficient corrosion resistance and high temperature strength under the high temperature and high pressure environment, for example, austenite stainless steel or nickel-group alloy.

However, a non-replaceable member of the in-core structure is exposed to a severe environment by a long-period operation of plant, and for this reason, the non-replaceable member receives an influence of neutron irradiation. As a result, a problem arises such that used materials are deteriorated. In particular, the vicinity of a welded portion of the in-core structure has a possibility of potential stress corrosion cracking due to material sensitization by welding input heat and the influence by tensile residual stress.

Recently, in order to stably and safely operate a nuclear power generation plant, a surface modification technology of various materials has been developed as preventive maintenance means. There is a technology of irradiating a laser beam to the surface of material so as to achieve surface modification. The technology has been disclosed in Japanese Patent Laid-Open Publications No. HEI 7-246483 and No. HEI 8-206869, for example.

In the above conventional examples, the technology described in the former is a laser peeling method, in which a laser beam emitted from a pulse laser device is irradiated to the surface (working surface) of a workpiece via a reflection mirror, and then, a residual tensile stress on the working surface is changed into a compression stress while varying the irradiating position on the working surface.

On the other hand, the technology described in the latter is an underwater laser machining method, in which a high output laser beam having a visible wavelength and a short pulse is irradiated to a working surface immersed in a cooling water, and thereby, a residual stress on the working surface is improved, thus eliminating crack or clad.

In the above conventional methods, an optical fiber cable is used to transmit a laser beam, and then, the laser beam is supplied to an in-core target via the optical fiber cable so as to work the working surface of the in-core structure.

In this case, the optical fiber cable used to transmit a laser beam considering a radiation resistance has a merit such that it is thin and light. However, the optical fiber cable has the following demerit. That is, the optical fiber cable has a large allowable bend radius (about 500 mm) and is easy to be broken when an external force is locally applied to the optical fiber cable (i.e., in a case where allowable or more bending, twist and tensile stress are applied to the optical fiber cable). For this reason, the optical fiber cable is moved to a place having a wide space such that the bend radius is allowable, without causing a problem, and the laser beam is irradiated to a working portion of the place via the optical fiber cable. However, in a complicate and narrow place, a problem arises such that it is impossible to close the optical fiber cable to the working portion due to contact with others.

Further, in the case of moving a working head attached with the optical fiber cable to a working position, during movement, an external force such as twist and tension is applied to the optical fiber cable, and for this reason, the optical fiber cable needs to be carefully handled. In the reactor pressure vessel having complicate and narrow portions, a problem arises such that it is excessive load for a worker to monitor a state that an external force is applied to the optical fiber cable and to take suitable measures thereto.

As described above, the optical fiber cable has a large bend radius and is easy to be broken. Therefore, the nuclear power generation plant needs to have construction and structure such that allowable or more bending, twist and tensile force are not applied to the optical fiber cable. Further, in the case of manufacturing an apparatus for the plant, the apparatus needs to have a structure such that the apparatus is quickly replaceable when it is broken down in error.

In the structure in the reactor pressure vessel, which is a target for preventive maintenance and repair of the reactor, a complicate and narrow portion exists. For example, as shown in FIG. 16, there exists a space (hereinafter, referred to as annulus space) surrounded by an inner wall of reactor pressure vessel 1, an outer wall of shroud 2 and a baffle plate 3. The space is very narrow because a jet pump 4 exists therein. Eight or more jet pumps 4 are arranged around the shroud 2. A welded structure such as jet pump 4 existing in the annulus portion has a complicate structure.

In the case of applying a preventive maintenance and repair apparatus for an underwater structure, in the use of laser, to the surface of the welded structure located in the annulus space, safety and reliability in handling of the optical fiber cable are very important.

In particular, in the welded structure of the annulus space, there exist a welding portion between a riser brass arm 6 fixing a riser pipe 5 of the jet pump 4 to the reactor pressure vessel 1 and the reactor pressure vessel 1, and a welding portion between the riser brass arm 6 and the riser pipe 5. These welding portions are positioned in a very complicate and narrow space, and for this reason, the apparatus must be made into a small size, and further, flexibility must be improved, in addition to the safe and reliable handling of the optical fiber cable.

The present invention has been made in view of the above circumstances. Therefore, an object of the present invention is to provide underwater maintenance and repair apparatus and method, which can achieve surface modification, surface machining and decontamination by precisely irradiating a laser beam in the underwater to a welding portion of an in-core structure located in a narrow space, such as a riser brass arm of a jet pump located in an annulus space of a reactor pressure vessel.

DISCLOSURE OF THE INVENTION

In order to achieve the above object, the present invention provides an underwater maintenance and repair apparatus, comprising: a laser oscillator for generating a laser beam; a working head movably attached to a portion in a vicinity of a working target portion in the underwater and adapted to scan the laser beam to the working target portion; an optical fiber cable for optically connecting the working head to the laser oscillator; and a joint mechanism arranged on a connective portion of the optical fiber cable and the working head to be separable through a remote control operation, wherein the working head irradiates the laser beam to a surface of the working target portion so as to achieve surface modification, surface working and decontamination.

Further, the present invention also provides an underwater maintenance and repair method, comprising the steps of: independently fixing a working head to a portion in a vicinity of a working target portion; jointing an optical fiber cable to the working head using a joint mechanism through a remote control operation; guiding a laser beam emitted from a laser oscillator via the optical fiber cable; and irradiating the laser beam from the working head to a surface of the working target portion while carrying out a scanning operation to the surface to achieve surface modification, surface working and decontamination.

According to the present invention, in the case of attaching the working head to a complicate and narrow portion, the optical fiber cable, which is lack of flexibility and breaks down when an external force exceeding an allowable range is locally applied, is removed from the working head. In this state, the working head is first attached to the working target portion, and thereafter, the optical fiber cable is attached to the working head. According to this structure, the working head, the cable and hose attached to the working head and the optical fiber cable are handled independently from each other, and thereby, it becomes possible to achieve surface modification, surface working and decontamination with respect to a complicate and narrow working target portion without breaking the optical fiber cable.

Preferred embodiments, modification examples and their operation and effect of the present invention will be further apparent from the following descriptions with reference to the accompanying drawings.

Incidentally, although the present invention is applicable to various liquid environments, it is one preferred embodiment to apply the present invention to maintenance and repair work in a reactor pressure vessel as in the present invention.

BRIEF DESCRIPTION OF THE DRAWINGS

FIG. 2A to FIG. 2C are individually cross sectional views showing a joint procedure of a joint mechanism shown in FIG. 1.

BEST MODE FOR CARRYING OUT THE INVENTION

Preferred embodiments of the present invention will be described hereunder with reference to the accompanying drawings.

[First Embodiment]

Figure 1:
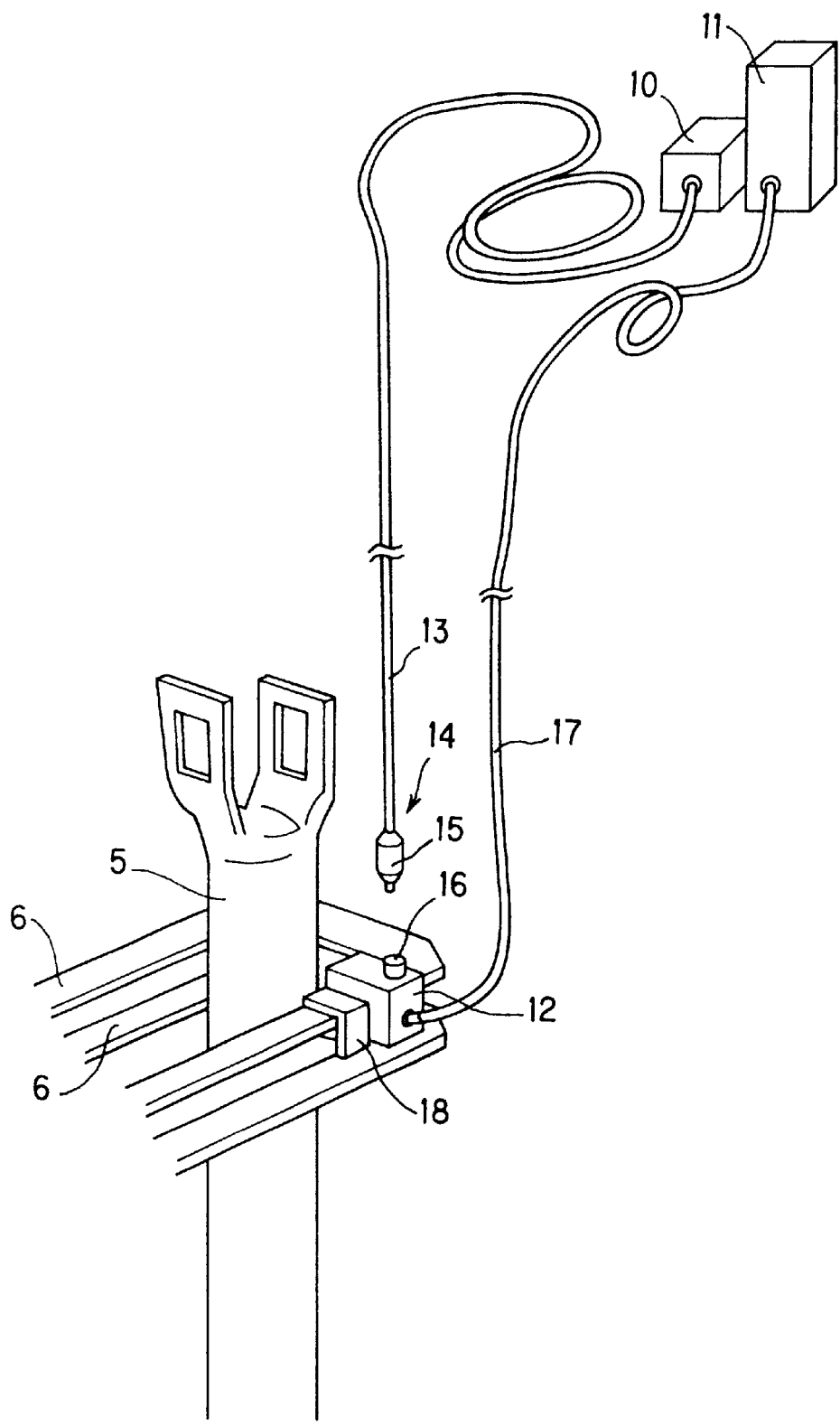
FIG. 1 is a view showing a whole structure of an underwater maintenance and repair apparatus according to a first embodiment of the present invention.

FIG. 1 is a view showing the whole structure of an underwater maintenance and repair apparatus according to a first embodiment of the present invention, and FIG. 2A to FIG. 2C are individually cross sectional views showing a joint (joining) procedure of a joint mechanism of the underwater maintenance and repair apparatus shown in FIG. 1.

In this first embodiment, a reactor pressure vessel is filled with a cooling water, and then, a laser beam is guided into an in-core (in-pile) structure located in the reactor pressure vessel using an optical fiber cable and is irradiated to the in-core structure surface to thereby achieve the surface modification, the surface machining and the decontamination.

As shown in FIG. 1, a laser oscillator (generator) 10 and a control panel 11 are located on an operation floor, not shown. The laser oscillator 10 is a device for generating a visible wavelength pulse laser such as a copper vapor laser or YAG laser (for second harmonic generation), and a pulse width of oscillated laser beam is less than 100 nsec.

The laser oscillator 10 is optically connected to an optical fiber cable 13 for transmitting a laser beam to a working head 12. The distal end portion of the optical fiber cable 13 is connected with a removable optical fiber connector plug 15, which is one of a joint mechanism 14. On the other hand, the working head 12 is attached with an optical fiber connector receptacle 16, which is the other one of the joint mechanism 14.

On the other hand, the control panel 11 is connected with a control cable 17, and the distal end of the control cable 17 is connected to the working head 12, and the control panel 11 is thus electrically connected to the working head 12 via the control cable 17. Through a remote control from the control panel 11, that is, through a control operation from the outside of the underwater, the optical fiber connector plug 15 is made removable to the optical fiber connector receptacle 16, and thereby, the working head 12 and the optical fiber cable 13 are separable to each other.

The working head 12 is fixed in the vicinity of the working target portion in the underwater by a head fixing mechanism 18, and is movable by a slide mechanism, not shown. Further, the working head 12 guides a laser beam oscillated from the laser oscillator 10 via the optical fiber cable 13, and then, scans it to the working target portion.

In the embodiment shown in FIG. 1, the working head 12 is fixed to a riser brass arm 6 for fixing a riser pipe 5 to the reactor pressure vessel 1 by the head fixing mechanism 18, and accordingly, the attachment position of the working head 12 to the riser brass arm 6 comes to the vicinity of the working target portion of the in-core structure.

FIG. 2A to FIG. 2C are individually cross sectional views showing a joint procedure of the joint mechanism 14. As shown in FIG. 2A, the optical fiber connector receptacle 16 of the working head 12 includes electromagnets 19a and 19b, which can turn on and off excitation through the remote control operation, and on the other hand, the optical fiber connector plug 15 has a connector case made of ferromagnetic material.

Therefore, in order to joint the optical fiber cable 13 to the working head 12, the optical fiber cable 13 having the distal end attached to the optical fiber connector plug 15 composed of ferromagnetic material is hung down from a portion above a reactor pool, and then, is inserted into the optical fiber connector receptacle 16 of the working head 12. Thereafter, as shown in FIG. 2B, the electromagnets 19a and 19b are excited through the remote control operation so that the optical fiber connector plug 15 is fixed as shown in FIG. 2C.

In this case, the working head 12 is provided with a reflection mirror 20 for reflecting a laser beam emitted from the optical fiber connector plug 15 at an angle of 90° when the optical fiber connector plug 15 is fixed in the optical fiber connector receptacle 16.

Accordingly, in this first embodiment, the working head 12 has the joint mechanism 14, so that the optical fiber cable 13 and the working head 12 can be readily jointed to and separated from each other by the remote control operation from the outside of the underwater.

An operation of this first embodiment will be described hereunder.

According to this first embodiment, the following working is carried out with respect to a complicate and narrow portion in the underwater. More specifically, the working head 12 including the head fixing mechanism 18 and head slide mechanism, not shown, is hung down from a portion above the reactor pool so as to close to a working portion. Then, the working head 12 is attached to the in-core structure by using the head fixing mechanism 18, and thereafter, is moved to a workable position by using the head slide mechanism provided in the working head 12. When such work is done in a state that the optical fiber cable 13 is attached to the working head 12, a bend or twist force is applied to the optical fiber cable 13, and for this reason, there is a high possibility that the optical fiber cable 13 is broken down.

However, in this first embodiment, the working head 12 and the optical fiber cable 13 have the joint mechanism 14 that is capable of closing and separating by the remote control. Thus, in the attachment work to a working target portion, the optical fiber cable 13 is removed from the working head 12, and after the attachment work of the working head 12 to the working target portion has been completed, the optical fiber cable 13 is jointed to the working head 12 so as to carry out this working. After such working has been completed, when a further working is carried out to another portion, the optical fiber cable 13 is again removed from the working head 12. Thereafter, in the same manner as that mentioned above, the attachment and working to the in-core structure can be achieved by using the head fixing mechanism 18 and the head slide mechanism of the work head 12.

More specifically, according to the underwater maintenance and repair method of this embodiment, the working head 12 is independently located and fixed in the vicinity of the working target portion, and the optical fiber cable 13 is then hung down from the portion above the reactor pool so as to be jointed to the working head 12 by using the joint mechanism 14. Thereafter, a laser beam from the laser oscillator 10 is guided to the working head 12 via the optical fiber cable 13, and then, is irradiated to the surface of the in-core structure while being scanned by the head slide mechanism of the working head 12. Thus, the surface modification, surface machining and decontamination can be effectively achieved.

As described above, according to the underwater maintenance and repair method of this first embodiment, the working head 12 and the optical fiber cable 13 have the joint mechanism 14 which is capable of closing and separating through the remote control operation from the outside of the underwater. Further, the working head 12 is attached to the in-core structure in a state of the optical fiber cable 13 being removed, and thereafter, the optical fiber cable 13 is attached to the working head 12. By employing the working procedure mentioned above, it becomes possible to realize the working with respect to a complicate and narrow portion without breaking or damaging the optical fiber cable 13.

In this first embodiment, the optical fiber connector receptacle 16 of the working head 12 is provided with the electromagnets 19a and 19b, and the connector case of the optical fiber connector plug 15 is composed of ferromagnetic material. Conversely, however, the optical fiber connector receptacle 16 may be composed of ferromagnetic material, and the optical fiber connector plug 15 may be provided with electromagnets.

[Second Embodiment]

Figure 3:
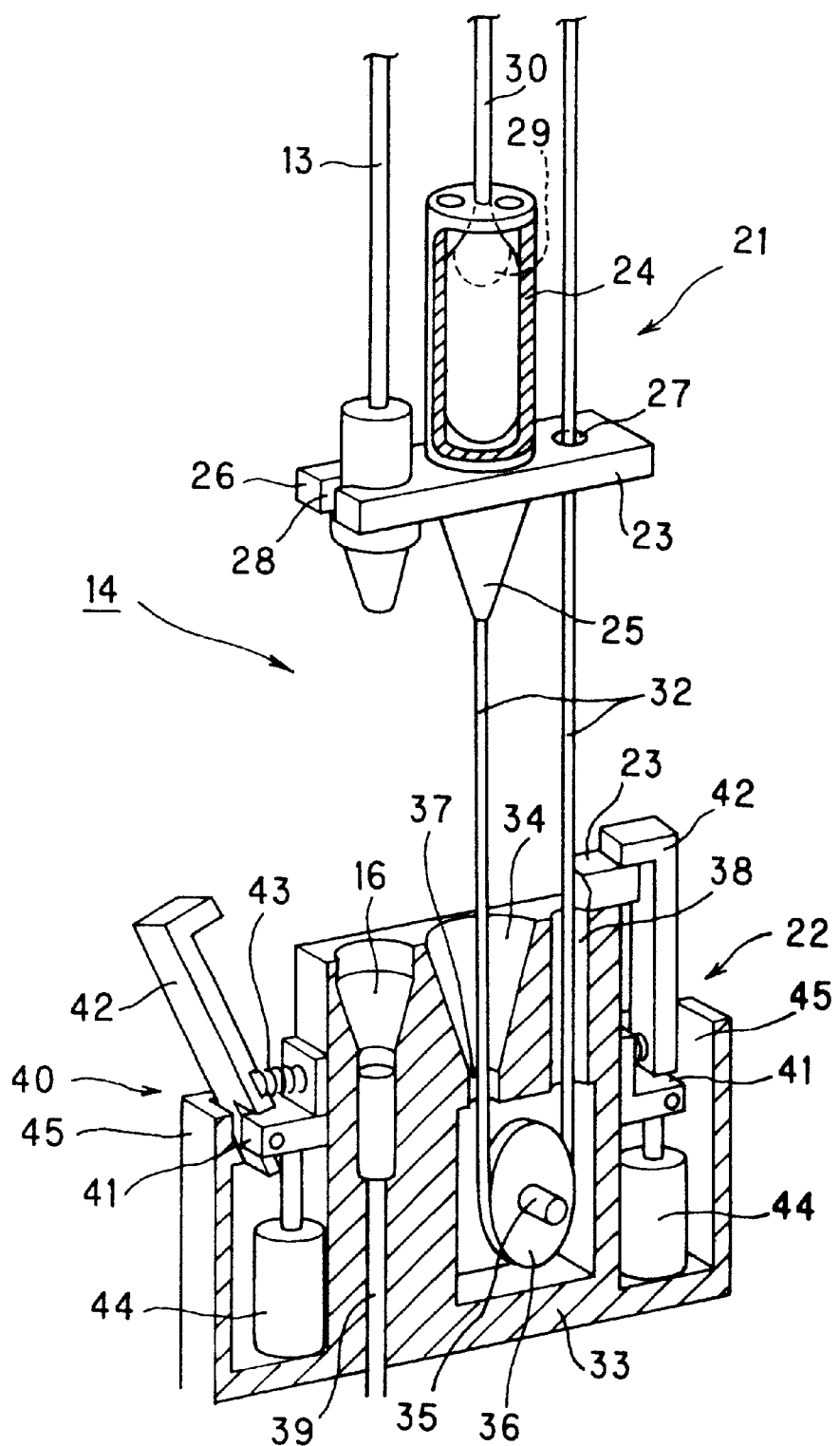
FIG. 3 is a perspective view partly in section showing a joint mechanism of an underwater maintenance and repair apparatus according to a second embodiment of the present invention.

FIG. 3 is a perspective view partly in section showing a joint mechanism of an underwater maintenance and repair apparatus according to a second embodiment of the present invention. In this case, like reference numerals are used to designate the same or corresponding portions as those of the above first embodiment, and only the construction and operation (function and/or effect) different from those of the above first embodiment will be described hereunder. This matter will be also applied to the embodiments following to the second embodiment as described hereinlater.

In this second embodiment, a wire system is used to joint the optical fiber cable 13 to the working head 12 for transmitting a laser beam thereto, and a clamp system is used to joint the optical fiber connector plug, and further, a buoyant force system is used to recover the optical fiber connector plug 15.

As shown in FIG. 3, a joint mechanism 14 includes a removable unit 21 and a joint unit 22, which are separable from each other, and the joint unit 22 is arranged on the working head 12 side.

The removable unit 21 includes a guide plate 23 formed like a flat plate, a hollow protective container 24, a checking male taper portion 25, a support portion 26, a guide hole 27 and a notch portion 28 formed in the support portion 26. More specifically, the hollow protective container 24 is fixed on the center of the guide plate 23, and the checking male taper portion 25 is fixed on the center of the lower surface of the guide plate 23. The support portion 26 is used for fixing the optical fiber connector plug 15 to the guide plate 23, and the guide hole 27 is formed in the guide plate 23 so that a wire rope, which will be described hereinlater, can pass therethrough.

In this case, the optical fiber connector plug 15 can be readily detached from the guide plate 23 by drawing downward the optical fiber connector plug 15, and then, removing the optical fiber cable 13 from the notch portion 28.

Furthermore, a float 29 which is expandable and shrinkable through air supply and air discharge is received in the protective container 24. An upper portion of the float 29 is connected to an air hose 30 penetrating through an upper plate of the protective container 24. The upper plate of the protective container 24 is formed with a plurality of drain holes 31. The distal end of the male taper portion 25 is connected to a wire rope 32.

On the other hand, the joint unit 22 is arranged on the working head 12 side and this joint unit 22 has a receiving block 33. The receiving block 33 is provided with an optical fiber connector receptacle 16 to which the optical fiber connector plug 15 is jointed, a female taper portion 34 into which the male taper portion 25 of the removable unit 21 is fitted, and a pulley 36. The pulley 36 is attached below the female taper portion 34 to be rotatable around a shaft 35. Further, the receiving block 33 is formed with a through hole 37 at the bottom portion of the female taper portion 34 and is formed with a through hole 38 at a portion in the vicinity of the female taper portion 34. The optical fiber connector receptacle 16 is provided with a mirror case 39 at its lower portion.

The wire rope 32 fed from the removable unit 21 passes through the through hole 37 formed at the lower portion of the female taper portion 34, and then, the drawing direction of the wire rope 32 is changed upwardly by the pulley 36. Thereafter, the wire rope 32 passes through the through hole 38 and the guide hole 27 of the removable unit 27, and then, is supplied to the upper portion, for example to an operation floor, not shown.

A clamp mechanism 40 functioning as a removable mechanism is incorporated into both sides of the receiving block 33 of the joint unit 22. The clamp mechanism 40 holds the removable unit 21 when the optical fiber connector plug 15 is jointed to the optical fiber connector receptacle 16. Further, the clamp mechanism 40 has a retaining metal tool 41, which is attached to a pawl 42 via a bearing. The pawl 42 is urged by a spring 43 so as to be always opened.

The lower portion of the retaining metal tool 41 is connected to a driving rod of an air cylinder 44. When the driving rod of the air cylinder 44 is compressed, the retaining metal tool 41 is received in a guide groove 45 forming a sidewall of the receiving block 33 and the pawl 42 is then closed.

This second embodiment will be operated in the manner mentioned hereunder.

In the case where the working head (working device) 12 is located in the reactor, in order to prevent damage to the optical fiber cable 13, the optical fiber cable 13 is removed from the guide plate 23. Thereafter, the wire rope 32 is fed in a state that the removable unit 21 and the joint unit 22 are jointed together (or the removable unit 21 is left on the operation floor, not shown), and according to this manner, the working head 12 is located in the reactor.

Subsequently, in order to joint the removable unit 21 and the joint unit 22, the air cylinder 44 is driven so that the retaining metal tool 41 including the pawl 42 is retracted in the guide groove 45. Then, the pawl 42 holds the guide plate 23 of the removable unit 21 while a force of pulling near being applied. The right-hand side of the joint unit shown in FIG. 3 shows a jointed state.

After the working head 12 is located, the removable unit 21 in a state that the removable unit 21 is separated from the joint unit 22, an air is supplied into the float 29 of the protective container 24 from the air hose 30 so that the float 29 is swelled. According to such manner, the removable unit 21 comes up to the water surface by a buoyant force generated by the supplied air.

Then, the removable unit 21 is pulled up on the operation floor, and thereafter, the optical fiber connector plug 15 is attached to the guide plate 23. The air of the float 29 is released, and then, the removable unit 21 is again sunk in the underwater of the reactor.

Then, by winding up the wire rope 32, the optical fiber cable 13 comes near the joint unit 22, and hence, is safely moved to a joint position of the working head 12 without applying a large bending force. In the case of separating the removable unit 21 from the joint unit 22, the procedure reverse to that mentioned above will be carried out.

As described above, according to the second embodiment, the laser beam is supplied to the working head 12 via the optical fiber cable 13, and then, stress improvement can be done with respect to all welding portions of the riser brass arm 6.

Furthermore, according to this second embodiment, since the float 29 is received in the protective container 24, the internal float 29 is protected, and it is possible to prevent an interference with peripheral equipments due to an excessive swelling. Further, in this case, the water in the protective container 24 is discharged to the outside via the drain hole 31.

[Third Embodiment]

Figures 4A, 4B:
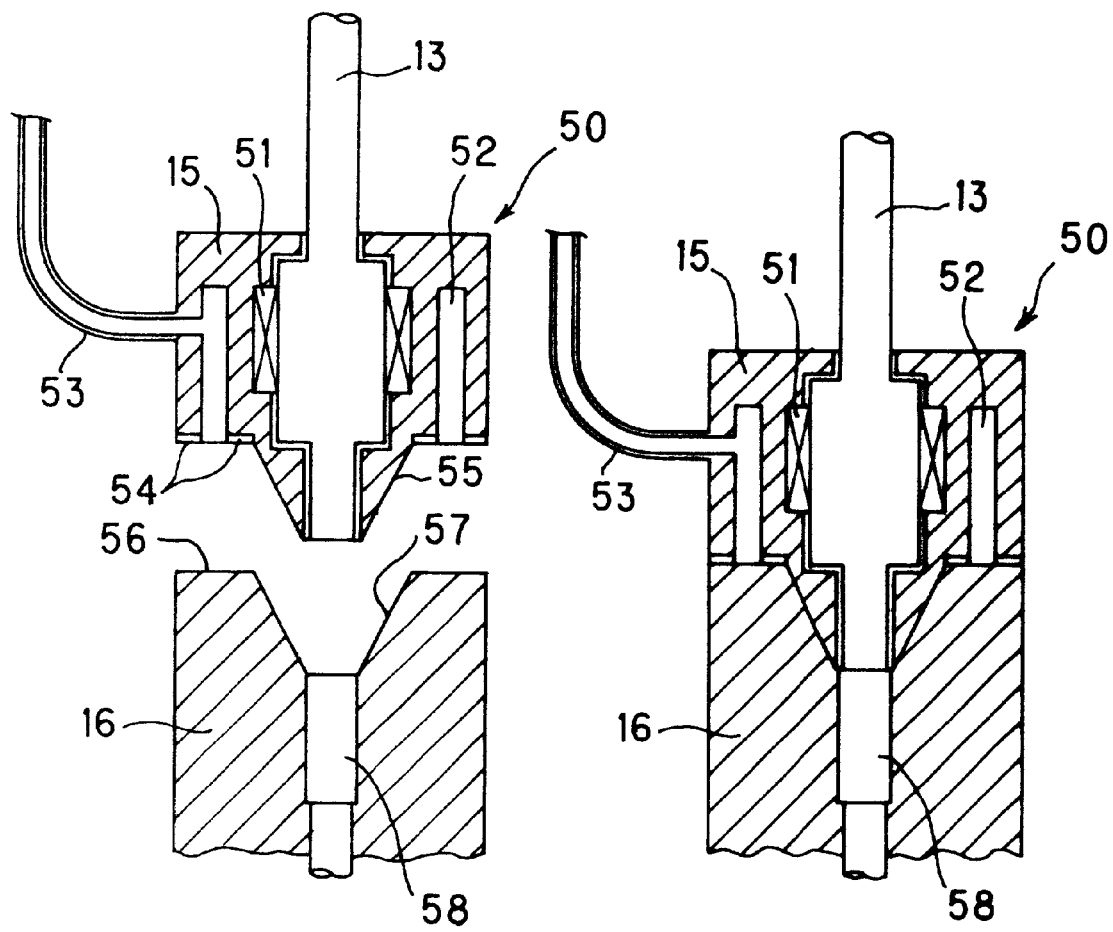
FIG. 4A and FIG. 4B are individually cross sectional views showing a joint mechanism of an underwater maintenance and repair apparatus according to a third embodiment of the present invention.

FIG. 4A and FIG. 4B are cross sectional views showing a joint mechanism of an underwater maintenance and repair apparatus according to a third embodiment of the present invention. FIG. 4A shows a state before joint, and FIG. 4B shows a jointed state.

As shown in FIG. 4A, a joint mechanism 50 of this third embodiment is composed of separable members, that is, an optical fiber connector plug 15, which is one of the joint mechanism, and an optical fiber connector receptacle 16, which is the other one of the same. In this case, the optical fiber connector receptacle 16 is located on the working head 12 side.

The optical fiber connector plug 15 is provided with a bearing 51 at an outer periphery of the attachment distal end of the optical fiber cable 13, and the optical fiber cable 13 is supported so as to be relatively rotatable. Further, the optical fiber connector plug 15 is formed with a ring-like suction chamber 52, which functions as an attracting mechanism, at an outer peripheral side of the bearing. The suction chamber 52 is connected to a suction hose 53, which is connected to the outside of the optical fiber connector plug 15 and functions as an attracting mechanism. The lower surface of the optical fiber connector plug 15, to which the suction chamber 52 is formed, is provided with a seal ring 54 at each of the outer and inner peripheries. Further, the center portion of the optical fiber connector plug 15 is formed with a male taper portion 55. The lower central portion of the male taper portion 55 is a laser beam emission opening.

On the other hand, the upper surface of the optical fiber connector receptacle 16 is formed with a seal surface 56, which abuts against the seal ring 54, at its outer peripheral side, and further, is formed with a female taper portion 57 at the center portion of the inner peripheral side. The lower portion of the female taper portion 57 is formed with a laser beam guide space 58 for receiving a laser beam.

This third embodiment will operate as follows.

When the optical fiber connector plug 15 is hung down so as to come near the optical fiber connector receptacle 16, the male taper portion 55 of the optical fiber connector plug 15 is fitted into the female taper portion 57 formed on the upper surface of the optical fiber connector receptacle 16. Accordingly, the joint center position is inevitably determined.

As shown in FIG. 4B, when the optical fiber connector plug 15 is fully fitted into the optical fiber connector receptacle 16, the seal ring 54 of the optical fiber connector plug 15 closely abuts against the seal surface of the upper portion of the optical fiber connector receptacle 16.

At that time, the optical fiber cable 13 is aligned with the center of the laser beam guide space 58 so as to form an optical path. Further, an air is suck by the suction hose 53 until an internal pressure of the suction chamber 52 becomes a negative pressure. Thus, a jointing force is generated, by the difference between a water pressure of the reactor pool and this negative pressure, to the optical fiber connector plug 15 and the optical fiber connector receptacle 16. Thus, these plug 15 and receptacle 16 can be jointed.

[Fourth Embodiment]

Figure 5:
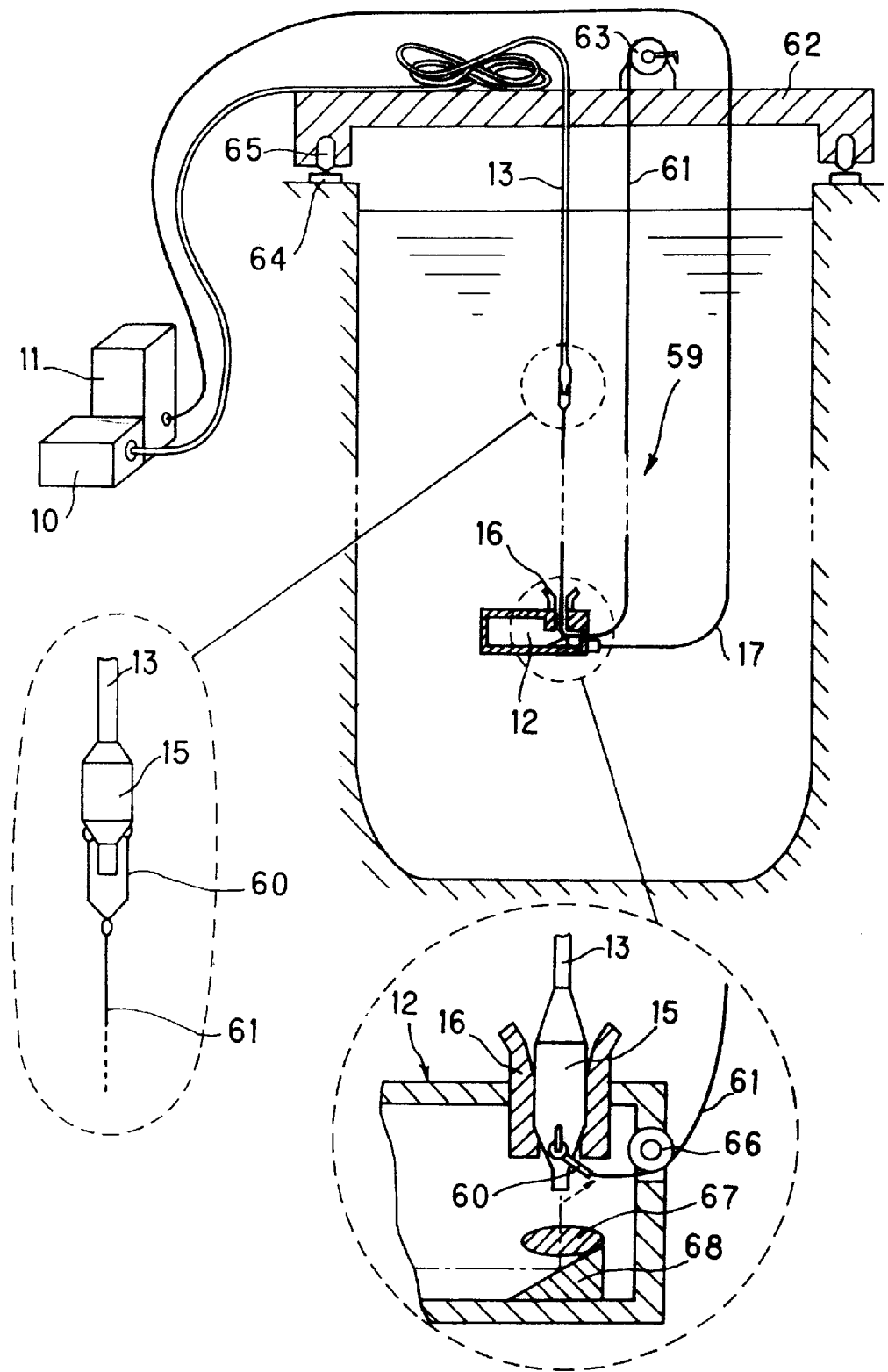
FIG. 5 is a view showing a structure of an underwater maintenance and repair apparatus according to a fourth embodiment of the present invention.

FIG. 5 is a view showing a structure of an underwater maintenance and repair apparatus according to a fourth embodiment of the present invention.

According to this fourth embodiment shown in FIG. 5, an optical fiber cable insertion guide mechanism 59 is provided. More specifically, when the optical fiber cable 13 is hung down from a portion above the reactor pool, the optical fiber cable insertion guide mechanism 59 is used for readily inserting the optical fiber cable 13 into the optical fiber connector receptacle 16 of the working head 12 without breaking the optical fiber cable 13.

In the optical fiber cable insertion guide mechanism 59, an optical fiber connector holding tool 60 is secured to the optical fiber connector plug 15 attached to the distal end portion of the optical fiber cable 13. The optical fiber connector holding tool 60 is connected to one end of a guide wire 61. The other end of the guide wire 61 passes through the optical fiber connector receptacle 16 of the working head 12 and is attached to a guide wire winding machine 63 located on a movable truck installed above the reactor pool.

As shown in FIG. 5, the movable truck 62 is equipped with wheels 65 for running on rails 64 laid on the surroundings of the reactor pool, and the movable truck 62 travels along the rails 64. Thus, the guide wire winding machine 63 can be arranged directly above the working head 12. On the other hand, the working head 12 is provided with a pulley 66 for winding up the guide wire 61, and further, provided with a reflection mirror 68 for reflecting a laser beam from the optical fiber connector plug 15 at an angle of 90° via a parallel beam lens 67.

The operation of the fourth embodiment will be described hereunder.

In order to joint the optical fiber connector plug 15 to the optical fiber connector receptacle 16 of the working head 12, the guide wire 61 is wound up by the guide wire winding machine 63, and the optical fiber connector plug 15 guided by the guide wire 61 is then jointed to the optical fiber connector receptacle 16. According to this manner, it becomes possible to readily separate and joint the optical fiber cable 13 and the working head 12.

As described above, according to this fourth embodiment, since the optical fiber cable insertion guide mechanism 59 of the structure mentioned above is used, it is possible to smoothly joint the optical fiber connector plug 15 to the optical fiber connector receptacle 16 without breaking the optical fiber cable 13.

[Fifth Embodiment]

Figure 6:
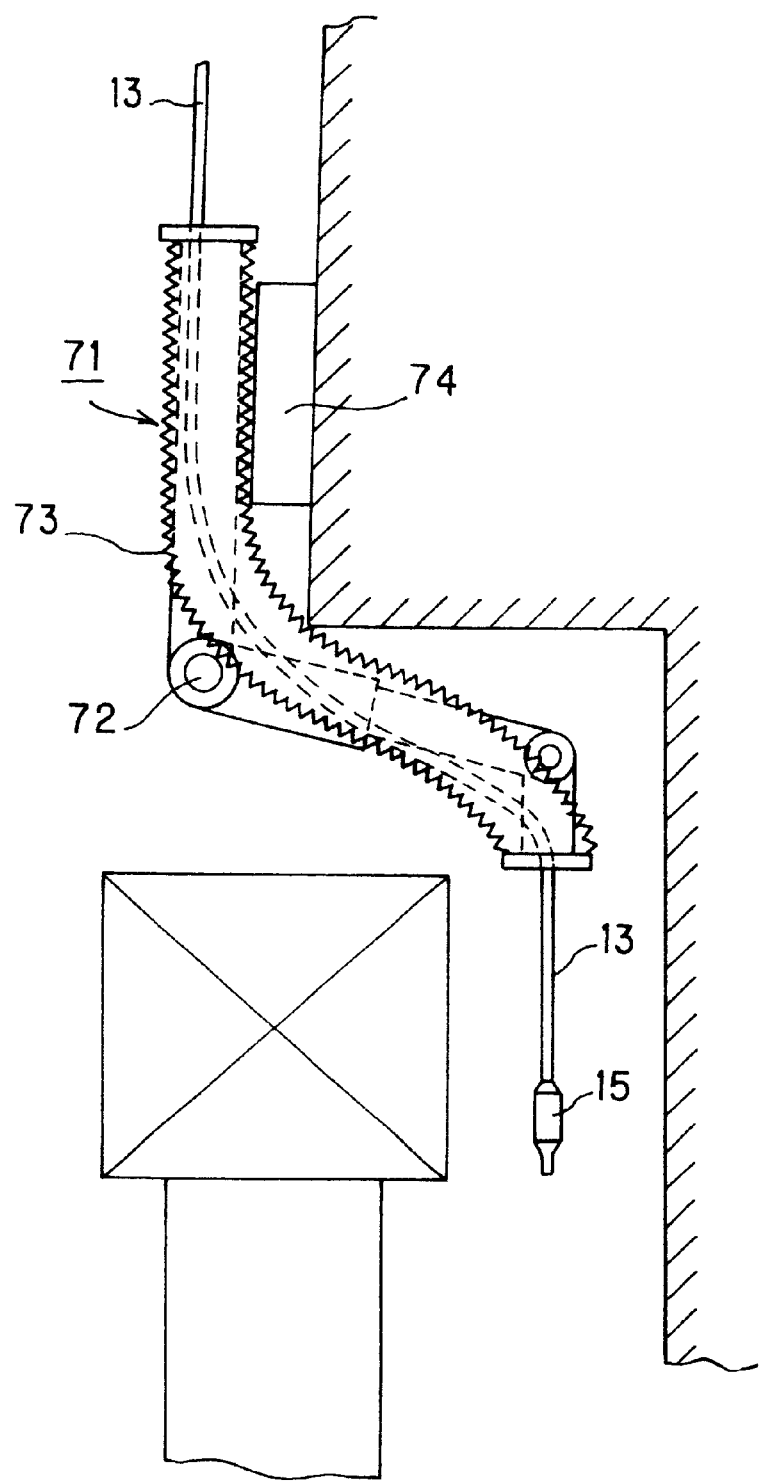
FIG. 6 is an enlarged view showing a structure of an underwater maintenance and repair apparatus according to a fifth embodiment of the present invention.

FIG. 6 is an enlarged view showing a structure of an underwater maintenance and repair apparatus according to a fifth embodiment of the present invention.

According to this fifth embodiment shown in FIG. 6, the optical fiber cable 13 is hung down from a portion above the reactor pool and is moved to the optical fiber connector receptacle 16 of the working head 12. In this process, an optical fiber guide mechanism 71 is used in a case where there exists a portion having a complicate shape on the midway of the hang-down path of the optical fiber cable 13. Accordingly, it is possible to pass the optical fiber cable 13 through the complicate portion without breaking the optical fiber cable 13.

The optical fiber guide mechanism 71 is composed of a three-freedom guide manipulator 72 including an expansible mechanism, a guide bellows 73 and a wall-stack type manipulator attachment 74. The guide bellows 73 is attached to the side of the guide manipulator 72 and is formed into a cylinder so as to pass the optical fiber cable 13 therethrough.

The operation of the fifth embodiment will be described hereunder.

The optical fiber guide mechanism 71 is fixed to a narrow portion having a complicate shape by the wall-stack type manipulator attachment 74, and by using the guide manipulator 72, the guide bellows 73 is made into a shape capable of passing through a complicate and narrow portion in an allowable bending range of the optical fiber cable 13. After the guide bellows 73 is made into a passable shape by the guide manipulator 72, the optical fiber cable 13 is inserted into the guide bellows 73, and then, passed therethrough.

As described above, according to this fifth embodiment, the optical fiber guide mechanism 71 is attached to the narrow portion having a complicate shape, and then, the optical fiber cable 13 is inserted through the guide bellows 73 of the optical fiber guide mechanism 71. According to this manner, it is possible to readily pass the optical fiber cable 13 through the complicate and narrow portion without breaking the optical fiber cable 13.

[Sixth Embodiment]

Figure 7:
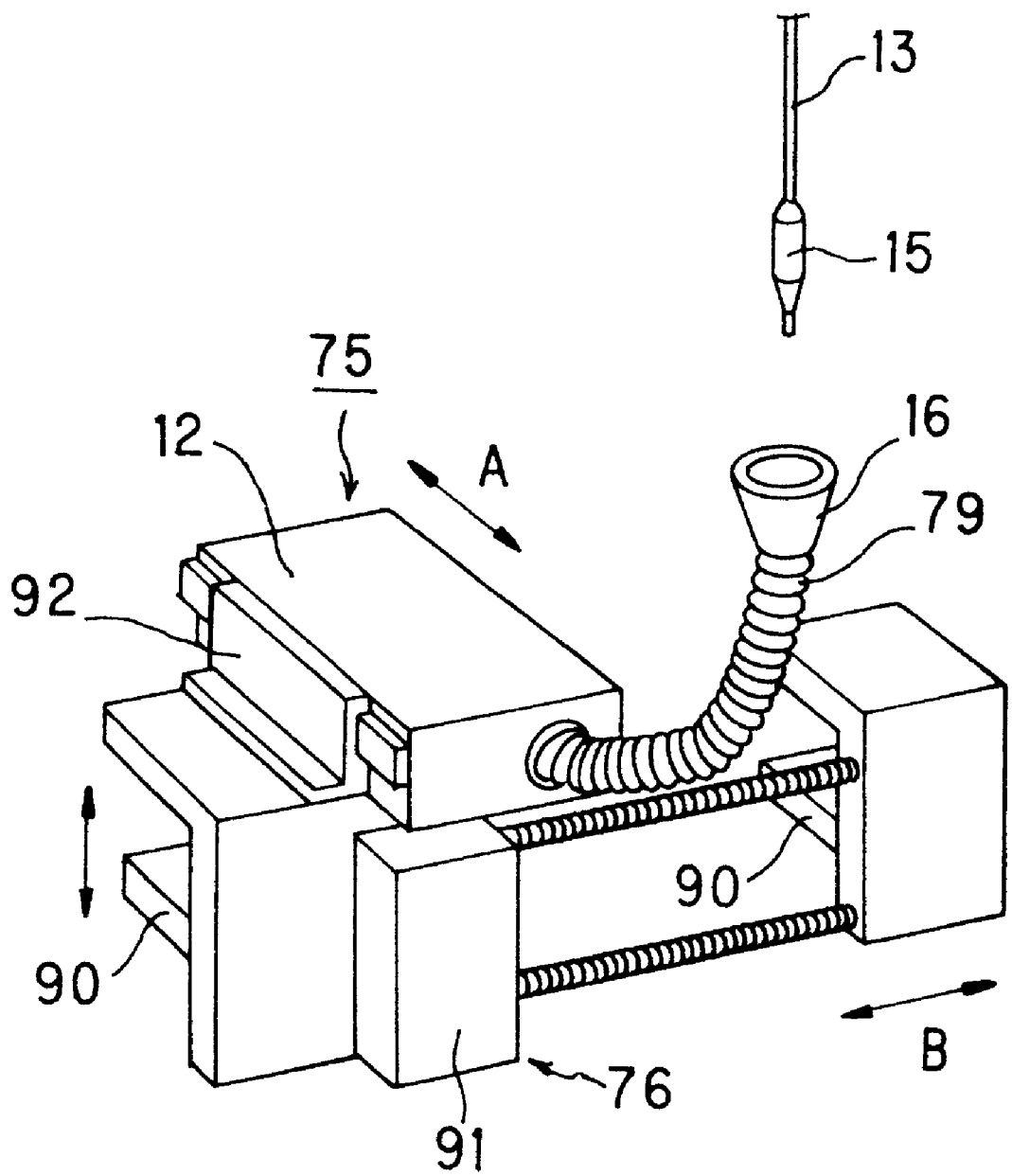
FIG. 7 is a perspective view showing a working head unit of an underwater maintenance and repair apparatus according to a sixth embodiment of the present invention.
Figure 8A:
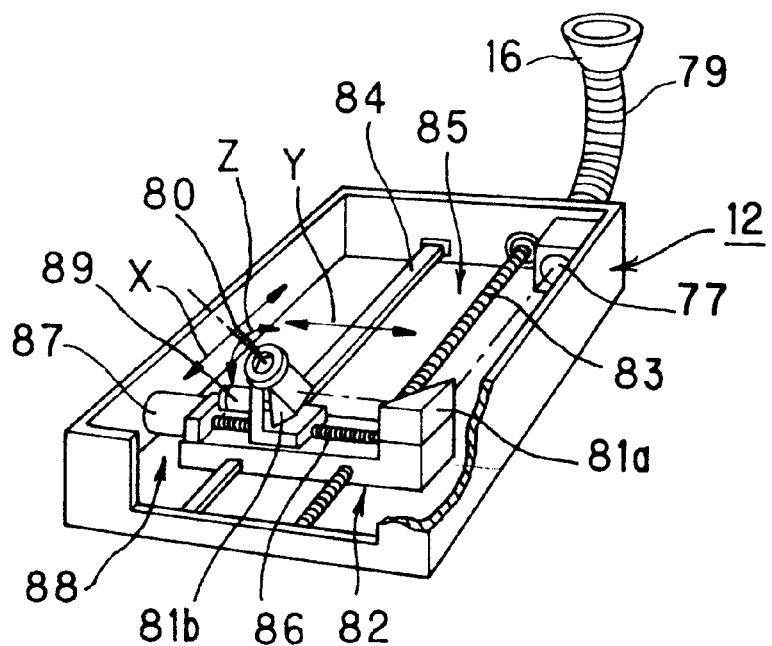
FIG. 8A is a perspective view showing an internal structure of the working head shown in FIG. 7

FIG. 7 is a perspective view showing a working head unit of an underwater maintenance and repair apparatus according to a sixth embodiment of the present invention. FIG. 8A is a perspective view showing an internal structure of the working head shown in FIG. 7, and FIG. 8B is a cross sectional view showing an optical fiber guide tube of FIG. 7.

As shown in FIG. 7, a working head unit 75 of this sixth embodiment is composed of the working head 12 and a working head attachment 76, which are constructed independently from each other and are used in a combined state. The working head 12 receives a laser beam via the optical fiber cable 13 and the optical fiber connector receptacle 16 and carries out the working while traveling a collective lens moving mechanism. On the other hand, the working head attachment 76 is attached to the in-core structure and is used to place the working head 12 to a working target place.

Figure 8B:
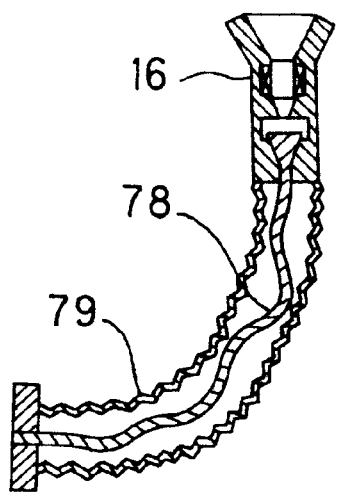
FIG. 8B is a cross sectional view showing an optical fiber guide tube of FIG. 7.

As shown in FIG. 8A and FIG. 8B, the working head 12 is composed of a parallel beam lens 77, a second optical fiber cable 78, an optical fiber guide tube 79, a collective lens 80, reflection mirrors 81a and 81b, and a collective lens moving mechanism 82. More specifically, the parallel beam lens 77 makes a laser beam transmitted via the optical fiber cable 13 and the optical fiber connector receptacle 16 into a parallel beam, and the second optical fiber cable 78 is used to transmit the laser beam passing between the optical fiber connector receptacle 16 and the parallel beam lens 77. The optical fiber guide tube 79 is formed into a shape of bellows so as to guide the second optical fiber cable 78, and the reflection mirrors 81a and 81b guides the laser beam from the parallel beam lens to the collective lens 80. The collective lens moving mechanism 82 is used to travel the collective lens 80.

The collective lens moving mechanism 82 is composed of a ball screw 83, a guide rail 84, an X-axis direction moving mechanism 85, a Y-axis direction moving mechanism 88, and a drive motor 89. More specifically, the X-axis direction moving mechanism 85 functions as a slide mechanism for moving the collective lens 80 along the X-axis direction by a drive motor, not shown. On the other hand, the Y-axis direction moving mechanism 88 functions as a slide mechanism for moving the collective lens 80 along the Y-axis direction by the ball screw 86 and a drive motor 87. The drive motor 89 is used to rock the collective lens 80 in a Z-axis direction.

On the other hand, the working head attachment 76 is composed of a pair of holding mechanisms 90, a horizontal slide mechanism 91, and a longitudinal slide mechanism 92. More specifically, the holding mechanisms 90 holds a plate-like in-core structure so as to fix the working head 12. The horizontal slide mechanism 91 slides the working head 12 in an A direction (horizontal direction) of FIG. 7, and the longitudinal slide mechanism 92 slides the working head 12 in a B direction (longitudinal direction) of FIG. 7.

The following description is made to an operation of this sixth embodiment.

The working head attachment 76 including the working head 12 is hung down from a portion above the reactor pool in a state that the optical fiber cable 13 is removed and is moved closely to a working target portion. Then, the working head attachment 76 is fixed to the plate-like in-core structure by the holding mechanism 90, and thereafter, the working head 12 is slid by the horizontal slide mechanism 91 and the longitudinal slide mechanism so as to be positioned to a working position. Subsequently, after the positioning has been completed, the optical fiber cable 13 is attached to the working head, and then, a work is carried out.

In the adoption of the procedure described above, even if the working head 12 is moved closely to the working target portion and then fixed and positioned thereon, the working is performed without breaking the optical fiber cable 13. Further, since the working head 12 and the working head attachment 76 have a simple and small size, it is possible to readily move the working head 12 to the working target portion having a complicate and narrow shape.

In this sixth embodiment, the second optical fiber cable 78 is interposed between the optical fiber connector receptacle 16 attached to the working head 12 and the parallel beam lens 77 near to the working target. Further, the second optical fiber cable 78 is arranged so as to mechanically closely connect to the end face of the optical fiber cable 13 at the optical fiber connector receptacle 16. According to this structure, it is possible to reduce an excessive bending of the optical fiber cable 13 and simplify the structure of the working head 12.

More specifically, in the second optical fiber cable 78, since a bellows bendable to an allowable bending radius of the optical fiber cable is used as the optical fiber guide tube 79, even if the working head 12 be slid, no external force is applied directly to the optical fiber cable 13. Therefore, an excessive bending of the optical fiber cable 13 can be reduced. Furthermore, since the second optical fiber cable 78 is provided up to the vicinity of the working target, the structure of the working head 12 can be simplified.

Moreover, in this sixth embodiment, the working head unit 75 is composed of the working head 12 and the working head attachment 76, which are separable and independent from each other. Therefore, one working head 12 and the working head attachment 76 are used in combination with each other in accordance with the complicate and narrow working target portion, that is, a shape, working position and direction of the working target portion.

As described above, according to the sixth embodiment, the working head 12 and the working head attachment 76 are used in combination with each other in accordance with the shape, the working position and direction of the working target portion, so that it is possible to readily carry out the working with respect to the complicate and narrow working target portion.

[Seventh Embodiment]

Figure 9:
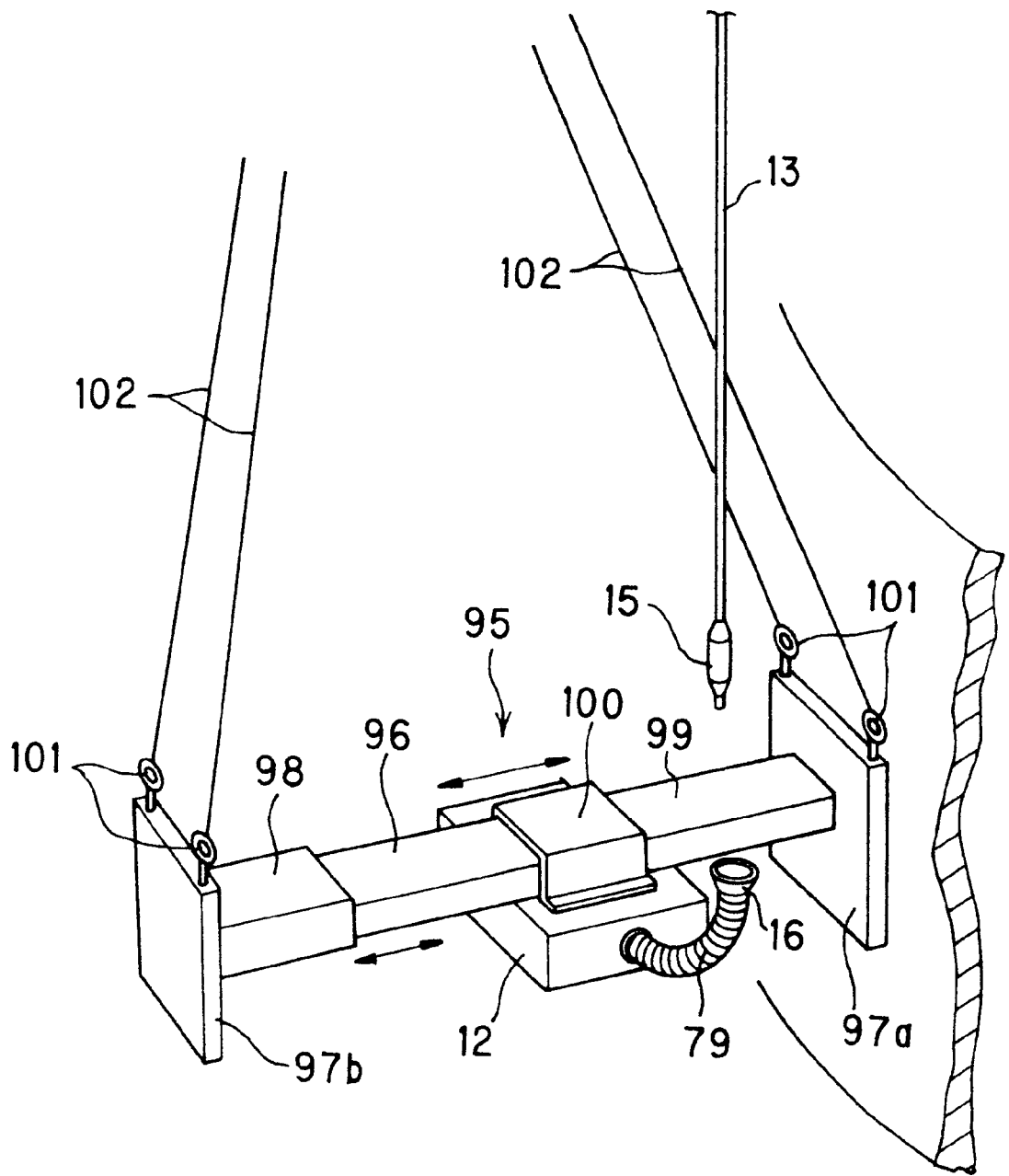
FIG. 9 is a perspective view showing a working head attachment of an underwater maintenance and repair apparatus according to a seventh embodiment of the present invention.

FIG. 9 is a perspective view showing a working head attachment of an underwater maintenance and repair apparatus according to a seventh embodiment of the present invention.

A working head attachment 95 of this seventh embodiment is constructed in a manner that the working head 12 is pressed from both sides between the in-core structures, that is, between the inner wall of the reactor pressure vessel and the shroud wall, and the working head is then fixed therein.

As shown in FIG. 9, the working head attachment 95 is composed of a head attachment member 96, an expansible mechanism for fixture 98, a rail 99, and a working head rail attachment drive mechanism 100. More specifically, the head attachment member 96 is attached with the working head 12, and the expansible mechanism 98 fixes the working head 12 by expanding the head attachment member 96 and pressing wall press plates 97a and 97b from both sides between the in-core structures. The rail 99 guides a slide of the working head 12 to a horizontal direction, and the working head rail attachment drive mechanism 100 functions as a slide mechanism for sliding the working head 12 along the rail 99.

Moreover, the wall press plates 87a and 97b are attached with two eyebolts 101, respectively, and a hoist wire 102 is inserted into these eyebolts 101, and the working head attachment 95 is thus hung down. On the other hand, the working head 12 is attached with an optical fiber guide tube 79 formed into a shape of bellows in the same manner as that of the seventh embodiment.

Next, the following is a description on an operation of this seventh embodiment.

The working head attachment 95 including the working head 12 is hung down from a portion above the reactor pool in a state that the optical fiber cable 13 is removed and comes near to a working target portion. Then, the working head attachment 95 is fixed to the in-core structure by the expansible mechanism 98, and thereafter, the working head 12 is slid by using the rail 99 by the working head rail attachment drive mechanism 100 so as to be positioned to a working position. After the positioning is completed, the optical fiber cable 13 is attached to the working head, and then, the working is carried out.

In the procedure described above, even if the working head 12 be moved near to the working target portion, and then fixed and positioned thereon, the working is carried out without breaking the optical fiber cable 13. Further, since the working head 12 and the working head attachment 95 have a simple and small size, it is possible to readily move the working head 12 to the working target portion having a complicate and narrow shape.

As described above, according to this seventh embodiment, the following effect is obtainable in addition to the effect of the seventh embodiment. More specifically, the working head is fixed by pressing it from both sides between the in-core structures by the expansible mechanism 98, and then, the working head attachment 95 can be positioned securely and readily.

[Eighth Embodiment]

Figure 10:
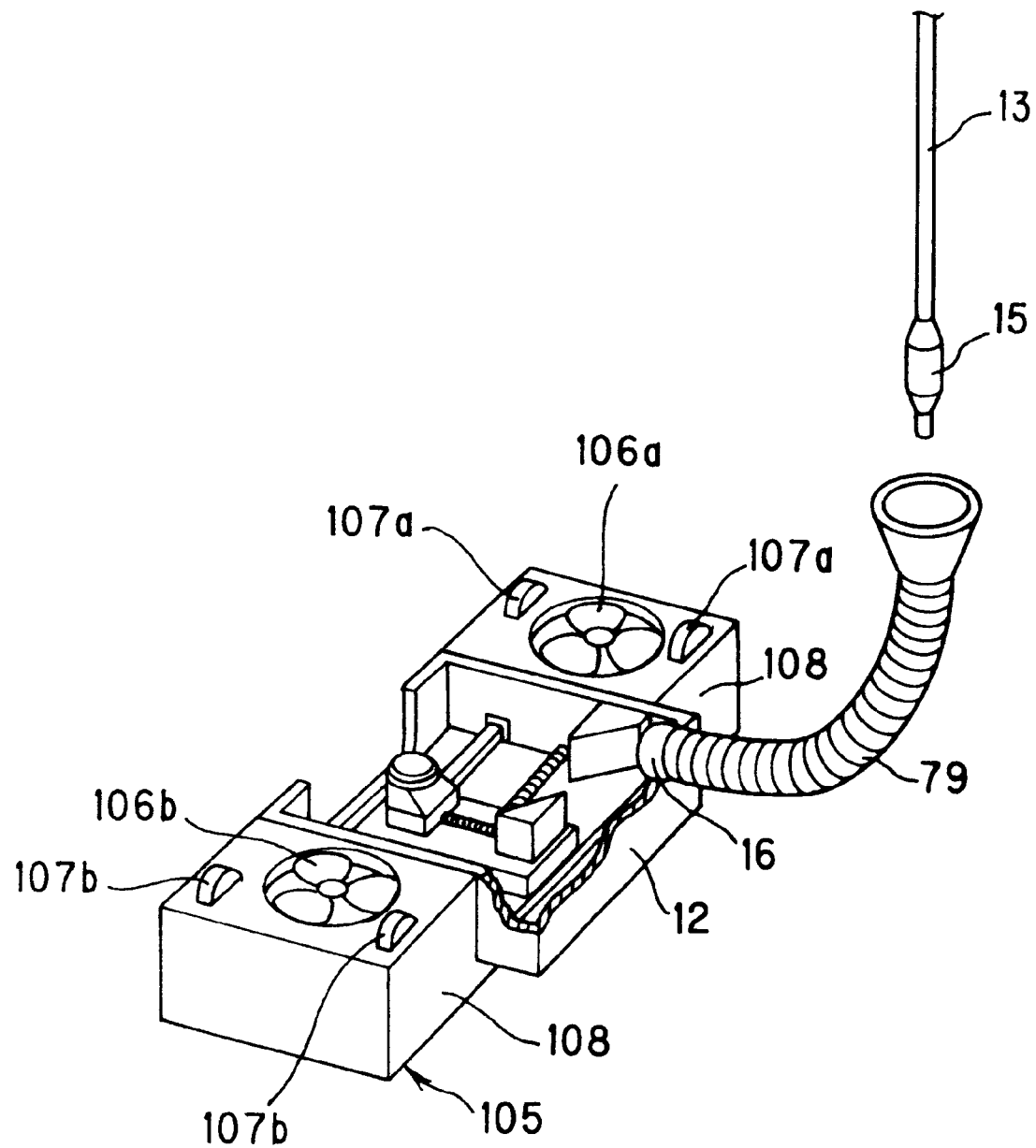
FIG. 10 is a perspective view showing a working head attachment of an underwater maintenance and repair apparatus according to an eighth embodiment of the present invention.

FIG. 10 is a perspective view showing a working head attachment of an underwater maintenance and repair apparatus according to an eighth embodiment of the present invention.

As shown in FIG. 10, a working head attachment 105 of this eighth embodiment is composed of suction fans 106a and 106b, two pairs of guide rollers 107a and 107b, and a guide roller drive mechanism 108. More specifically, the suction fans 106a and 106b are sucked to a reactor pressure vessel or shroud wall so as to fix the working head 12 is, and two pairs of guide rollers 107a and 107b slide the working head 12 to a horizontal direction. The guide roller drive mechanism 108 functions as a drive mechanism for rotating the guide rollers 107a and 107b.

The guide roller drive mechanism 108 includes a drive motor and drive connecting means such as a belt, gear or the like. When the drive motor is driven, a driving force is transmitted to the guide rollers 107a and 107b via the above drive connecting means so that these guide rollers 107a and 107b are rotated.

In this embodiment, the working head 12 is provided with rocking means for rocking the collective lens, a moving mechanism for moving the collective lens to X- and Y-axis directions and laser beam guide means such as a reflection mirror or the like, like the embodiment shown in FIG. 8.

Next, the following description will be made on an operation of the eighth embodiment.

The working head attachment 105 including the working head 12 is hung down from a portion above the reactor pool in a state that the optical fiber cable 13 is removed, and thereafter, is moved near the working target portion. Then, the working head attachment 105 is fixed to the in-core structure by driving the suction funs 106 and 106b and the working head 12 is slid using the rail 99 by the guide roller drive mechanism 108 and the guide rollers 107a and 107b so as to be positioned to a working target position. After the positioning is completed, the optical fiber cable 13 is attached to the working head 12, and then, the working is carried out.

In the procedure described above according to this eighth embodiment, even if the working head 12 be moved near the working target portion and is then fixed and positioned thereon, the working is carried out without breaking the optical fiber cable 13. Furthermore, since the working head 12 and the working head attachment 105 have a simple and small size, it is possible to readily move the working head 12 to the working target portion having a complicate and narrow shape.

[Ninth Embodiment]

Figure 11:
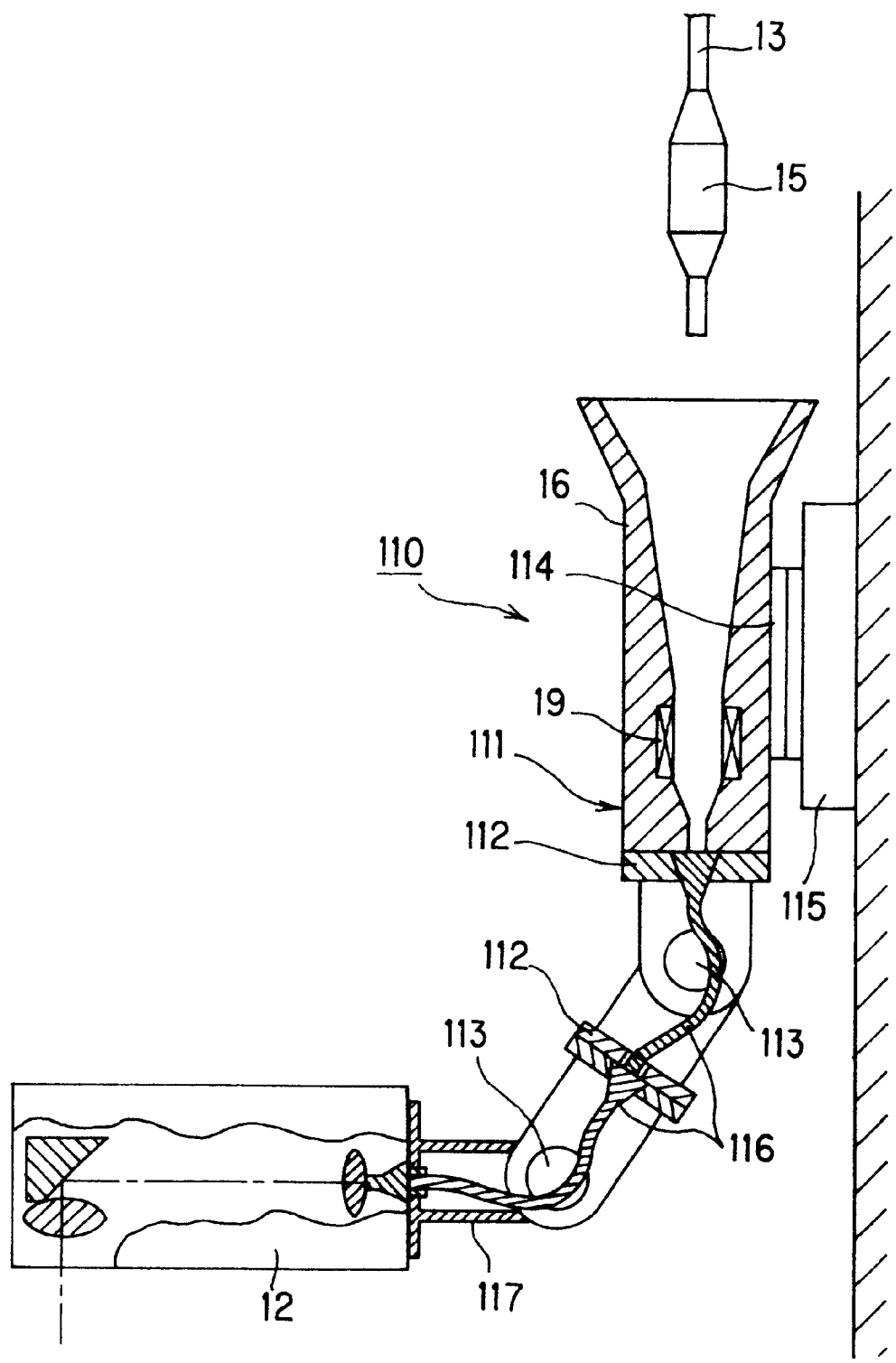
FIG. 11 is a front view partly in section showing a working head attachment of an underwater maintenance and repair apparatus according to a ninth embodiment of the present invention.

FIG. 11 is a front view partly in section showing a working head attachment of an underwater maintenance and repair apparatus according to a ninth embodiment of the present invention.

As shown in FIG. 11, a working head attachment 110 of this ninth embodiment is composed of a working head attachment manipulator 111, a wall-stack type manipulator attachment 115, a relay optical fiber cable 116, and a working head connecting jig 117. More specifically, the working head attachment manipulator 111 includes joint portions 112 and 113 and a vertical drive mechanism 114. The joint portion 112 and 113 moves the optical fiber connector receptacle 16 in a rotating direction and its reverse direction so as to be positioned. On the other hand, the vertical drive mechanism 114 vertically drives the optical fiber connector receptacle 16. The wall-stack type manipulator attachment 115 functions as a sticking mechanism for fixing the working head attachment manipulator 111 to an inner wall of reactor pressure vessel or shroud wall. The relay optical fiber cable 116 is interposed between the joint portions of the working head attachment manipulator 111, and the working head connecting jig 117 is used to connect the working head 12 with the joint portions 112 and 113.

The following is a description on an operation of this ninth embodiment.

The working head attachment 110 including the working head 12 is hung down from a portion above the reactor pool in a state that the optical fiber cable 13 is removed, and thereafter, is moved near the working target portion. Then, the working head attachment 110 is fixed to the in-core structure by the manipulator attachment 115, and thereafter, the working head 12 is moved by the working head attachment manipulator 111 so as to be positioned to the working target position. After the positioning is completed, the optical fiber cable 13 is attached to the working head 12, and then, the working is carried out.

In the procedure described above according to this ninth embodiment, even if the working head 12 be moved near the working target portion, and is fixed and positioned thereon, the working is carried out without breaking the optical fiber cable 13. Furthermore, since the working head 12 and the working head attachment 110 have a simple and small size, it is possible to readily move the working head 12 to the working target portion having a complicate and narrow shape.

[Tenth Embodiment]

Figure 12:
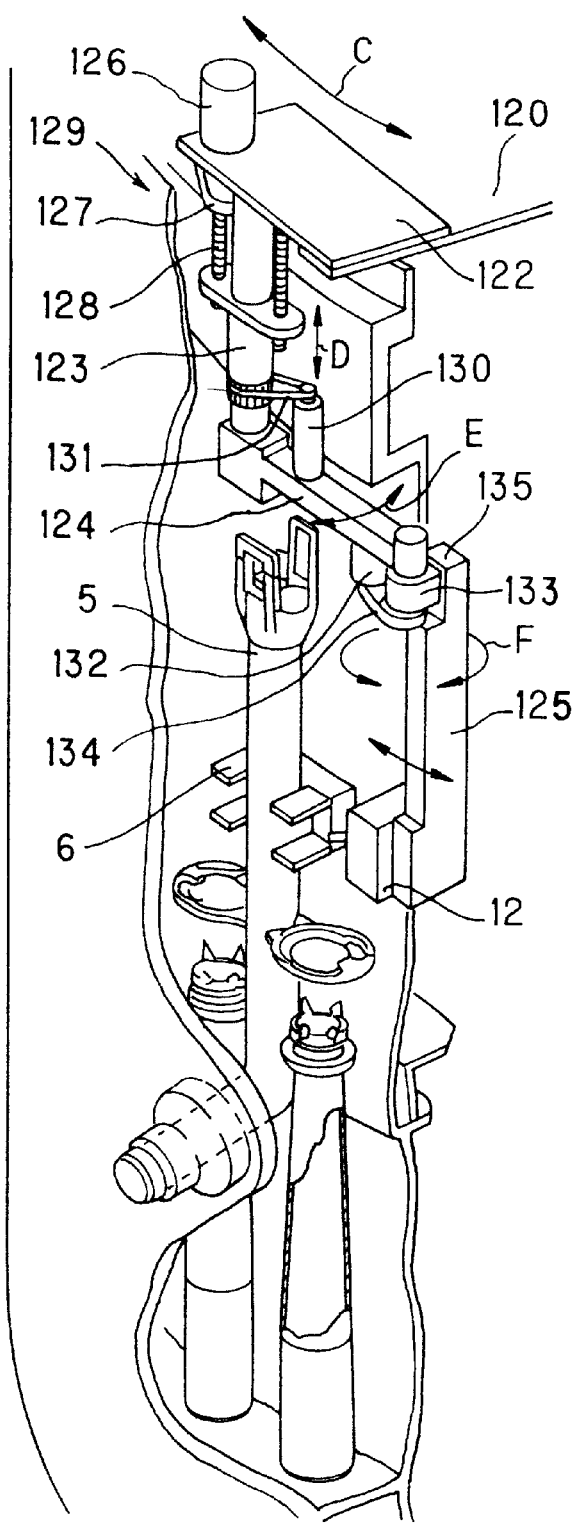
FIG. 12 is a perspective view showing an underwater maintenance and repair apparatus according to a tenth embodiment of the present invention for explaining a working method of a riser brass arm welding portion by using a manipulator system.

FIG. 12 is a perspective view explaining a working method to a riser brass arm welding portion by using a manipulator system in an underwater maintenance and repair apparatus according to a tenth embodiment of the present invention.

As shown in FIG. 12, an upper portion of reactor lattice plate is provided with a working unit attachment 120 of a turning track movable to a direction shown by an arrow C. The working unit attachment 120 is attached with a working unit 121, which is a manipulator type working device. The working unit 121 is attached with a working head 12 at its lower end. The working head 12 is positioned at the same level of height as that of the riser brass arm 6.

The working unit 121 is generally composed of a base plate 122 located on the working unit attachment 120, an elevating shaft 123, a turning arm 124 attached to the lower end of the elevating shaft 123, a turning mast 125 attached to the distal end of the turning arm 124, and a working head 12. More specifically, the elevating shaft 123 is attached to the center on the lower surface of the base plate 122 so as to extend vertically and downwardly. The working head 12 is attached to the distal end of the turning mast 125. These elements of the working unit 12 are mechanically connected and have a constant movable range.

The base plate 122 is provided with a drive motor 126, a power transmission mechanism 127 and an elevating mechanism 129. More specifically, the power transmission mechanism 127 comprises a pulley and a belt connected to the drive motor 126, and the elevating mechanism 129 comprises a ball screw 128 connected to the power transmission mechanism 127. The elevating mechanism 129 drives mechanisms after the location of the turning arm 124 attached to the lower portion of the elevating shaft 123 in a vertical direction shown by an arrow D.

Further, a drive motor 130 is located at the vicinity of the elevating shaft 123 in the turning arm 124. A driving belt 131 is stretched between a pulley of the drive motor 130 and the a groove formed at the outer periphery of the elevating shaft 123, and when the drive motor 130 is driven, the turning arm 124 can be turned in a direction shown by an arrow E.

Furthermore, a driving belt 134 is stretched between a rotary shaft of a drive motor 132 located in the vicinity of the distal end of the turning arm 124 and a pulley fixed to a first joint 133 including a rotary bearing. When the drive motor 132 is driven, mechanisms after the location of the working mast 125 can be turned in a direction shown by an arrow F. The fist joint 133 and the turning mast 125 are connected by a second joint 135 including a rotary bearing, and accordingly, it is possible to absorb an inclination of the working head 12 due to an installation error of the working unit 121 or the like.

Figure 13A:
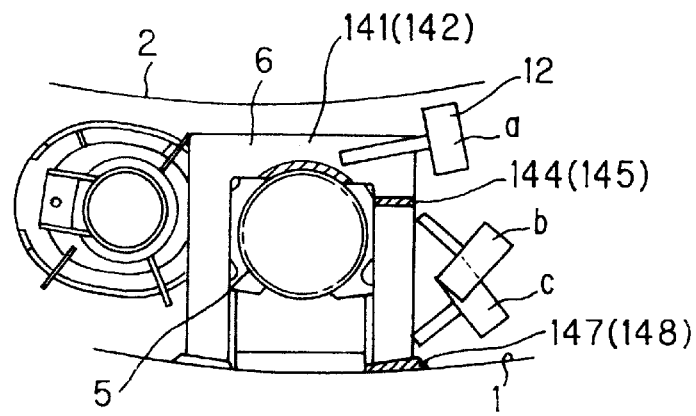
FIG. 13A is a top plan view showing a working portion of the riser brass arm.
Figure 13B:
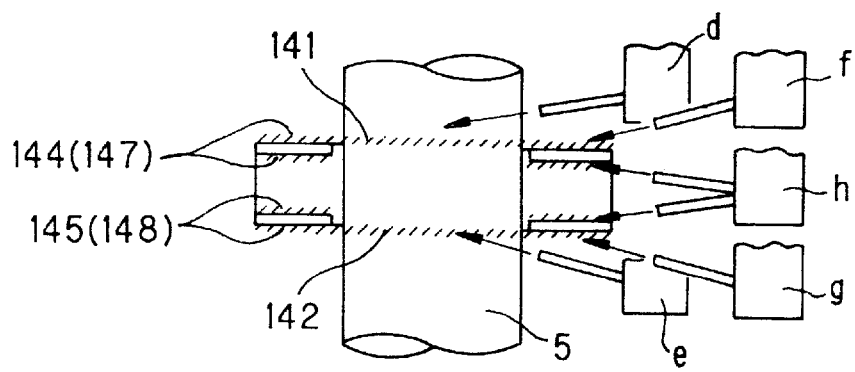
FIG. 13B is a side view showing the same as above.
Figure 13C:
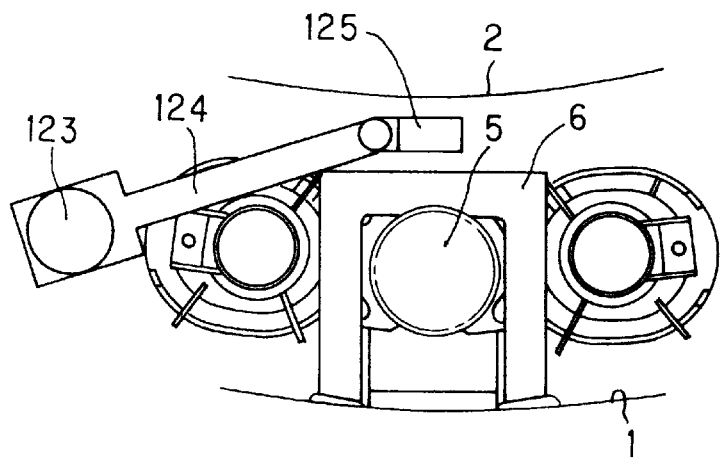
FIG. 13C is a top plan view showing a direction of the working head to the working portion of the riser brass arm.

FIG. 13A is a top plan view showing a working portion of the riser brass arm, FIG. 13B is a side view thereof, and FIG. 13C is a top plan view showing a direction of working head to the working portion of the riser brass arm.

As shown in FIG. 13A and FIG. 13B, the riser pipe 5 is provided with vertically arranged two welding joint portions shown by reference numerals 141 and 142. Moreover, in the riser brass arm 6, the following welding joint portions exist. That is, the welding joint portions include front and back portions of an upper arm 144 and front and back portions of a lower arm 145 on the side of the shroud 2, and front and back portions of an upper arm 147 and front and back portions of a lower arm 148 on the side of the reactor pressure vessel 1. Welding joint portions of the same number as those mentioned above exist to counter side riser brass arm 6 (opposite, in arrangement, to that mentioned above).

Therefore, there is a need of changing a direction of the working head with respect to the welding working portion, and FIG. 13A shows that direction of the working head 12. The direction of the working head 12 must be changed to a position 'a' with respect to a welding joint portion with the riser pipe 5, and to a position 'b' with respect to a welding joint portion of the arm on the shroud side. Further, the direction of the working head 12 must be changed to a position 'c' with respect to a welding joint portion of the arm on the reactor pressure vessel side.

Furthermore, as shown in FIG. 13B, the height of the working head 12 must be changed to a position 'd' with respect to the upper welding joint portion with the riser pipe 5 and changed to a position 'e' with respect to the lower welding joint portion. In addition, an emission angle of laser beam must be changed to the upward and downward directions.

The height of the working head 12 must be changed to positions 'f', 'h' and 'g' with respect to the welding joint portion of the riser brass arm 6 in the upper and lower surfaces of the upper arm. An emission angle of the laser beam must be changed to the upward and downward directions. Thus, the direction of the working head 12 must be changed in accordance with the positions as described above.

In order to carry out a working with respect to the counter-side (opposite side) working portion, the working head 12 is passed through a gap between the shroud 2 and the riser pipe 5, and thereafter, the direction of the working head 12 is inverted by an angle of about 180°.

In this case, the working head 12 is positioned to each of the positions 'a', 'b' and 'c' shown in FIG. 13A according to the turning operation by the drive motor 130 and the rotating operation by the drive motor 132.

Further, the working head 12 is positioned to each of the positions 'd', 'e', 'f', 'g' and 'h' shown in FIG. 13B according to the elevating operation by the drive motor 126, and thus, the working head 12 is vertically moved and positioned.

Furthermore, in order to move the working head 12 to the counter-side working portion, as shown in FIG. 13C, the drive motor 132 is driven so that the working head 12 is made parallel to the shroud 2. Thereafter, the drive motor 130 is driven so that the turning arm 124 is turned so as to move the working head 12 near the shroud side together with the turning mast 125.

In addition, when a turning unit, not shown, is rotated and then passed through the riser pipe, each shaft of the working unit 121 is again driven so that the working head 12 is positioned.

As described above, according to this tenth embodiment, it is possible to position the working head 12 to the working target portion through the manipulator positioning control by the remote control means.

[Eleventh Embodiment]

Figure 14:
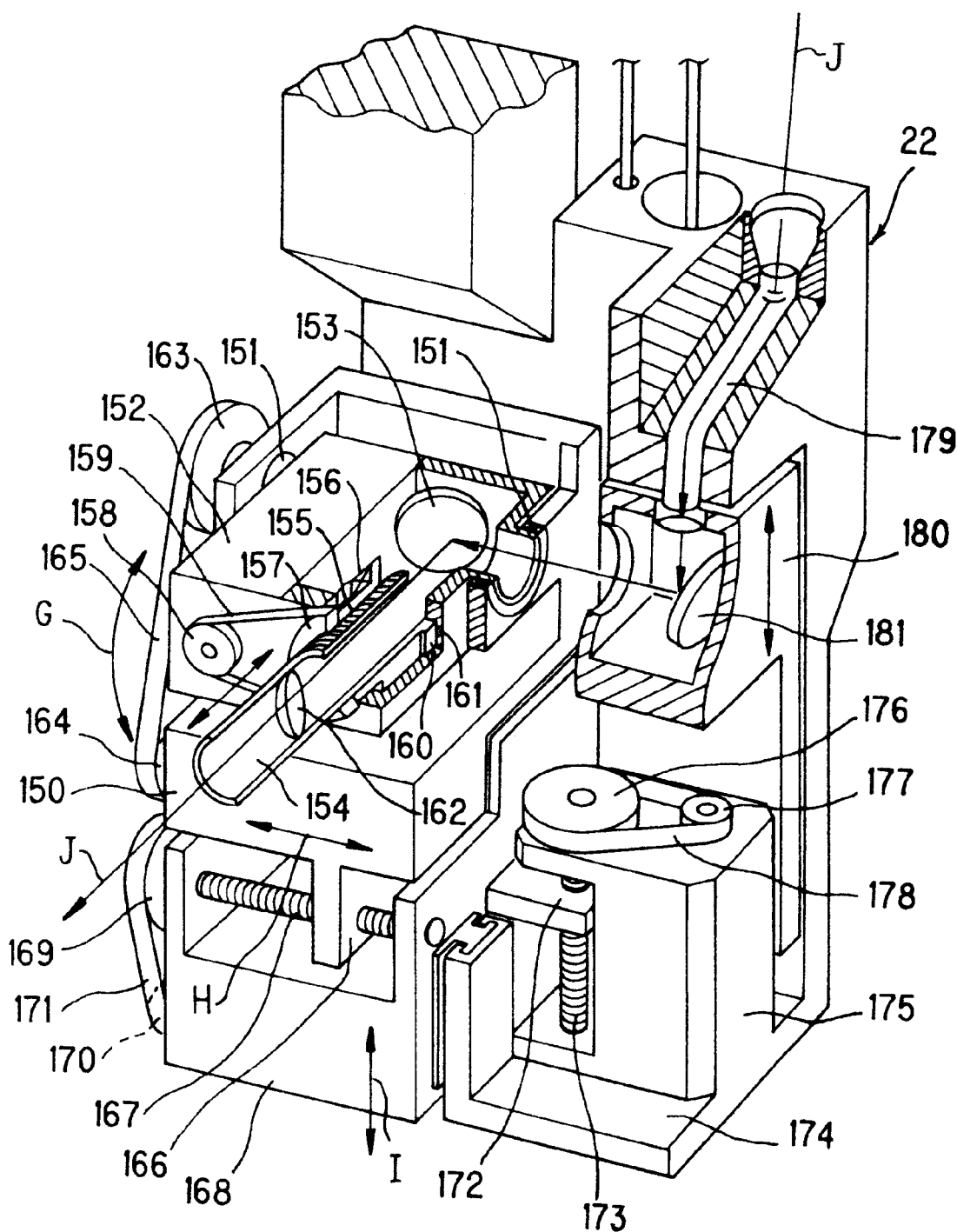
FIG. 14 is a perspective view showing a working head of an underwater maintenance and repair apparatus according to an eleventh embodiment of the present invention.

FIG. 14 is a perspective view showing a working head of an underwater maintenance and repair apparatus according to an eleventh embodiment of the present invention. In this eleventh embodiment, the working head used in the tenth embodiment is shown as one example.

As shown in FIG. 14, the working head 12 is provided with a joint portion 22 for receiving a laser beam at its upper portion and also provided with a rotary base 150 at its center portion. The rotary base 150 is attached with a nozzle attachment base 152 through a bearing 151. The nozzle attachment base 152 is provided with a reflection mirror 153, an expansible nozzle 154 and a nut 155 engageable with a screw thread formed to the outer peripheral side of the expansible nozzle 154, at its one side. The outer periphery of the nut 155 is attached to the nozzle attachment base 152 through a bearing 156.

Further, one side of the nut 155 is joined with a pulley 157, and a belt 159 is stretched between the pulley 157 and a pulley 158 mounted to a rotary shaft of a drive motor, not shown, built in the nozzle attachment base 152. Thus, the power is transmitted to the pulley 157 via the belt 159 from the pulley 158.

Furthermore, the mirror side end portion of the expansible nozzle 154 is provided with a guide key 160. The guide key 160 is fitted into a guide groove 161 formed to the nozzle attachment base 152 so as to guide the expansible nozzle 154 in a non-rotatable fashion. A collective lens is incorporated in the expansible nozzle 154.

Therefore, the drive motor built in the nozzle attachment base 152 is driven, and the power is transmitted to the pulley 157 via the belt 159 from the pulley 158. Thus, the pulley 157 can be rotated. According to such structure, since the nut 155 becomes rotatable, the expansible nozzle 154 becomes expansible.

On the other hand, the rotary base 150 has a built-in drive motor (not shown) at its internally central portion. A belt 165 is stretched between a pulley 163 fixed to the rotary shaft of the nozzle attachment base located on the upper portion of the rotary base 150 and a pulley 164 of the aforementioned drive motor, and the power is transmitted to the pulley 163 via the belt 165 from the pulley 164.

Therefore, when the drive motor built in the rotary base 150 is driven, the power is transmitted to the pulley 163 via the belt 165 from the pulley 164, and then, the nozzle attachment base 152 becomes swingable in a range shown by an arrow G. According to this arrangement, it is possible to change an angle of the expansible nozzle 154.

Furthermore, the rotary base 150 is attached with a ball nut 166 at its lower portion. The ball nut 166 is engaged with a ball screw 167 and fixed to a horizontal (traverse) base 168. The horizontal base 168 has a built-in drive motor. A belt 171 is stretched between a pulley 169 fixed to the end portion of the ball screw 167 located on the upper portion of the base and a pulley 170 fixed to the rotary shaft of the aforementioned drive motor, and then, the power is transmitted to the pulley 169 via the belt 171 from the pulley 170.

Accordingly, when the drive motor built in the horizontal base 168 is driven, the power is transmitted to the pulley 169 through the belt 171 from the pulley 170, so that the rotary base 150 can make a transverse operation shown by an arrow H.

Furthermore, a ball nut 172 is fixed to the side portion of the horizontal base 150. The ball nut 172 is engaged with a ball screw 173, which is fixed to an elevating base 174. The elevating base 174 is formed integrally with an elevating base 175, which has a built-in drive motor.

A belt 178 is stretched between a pulley 176 fixed to the upper end portion of the ball screw 173 and a pulley 177 fixed to the rotary shaft of the drive motor built in the elevating base 175, and the power is then transmitted to the pulley 176 via the belt 178 from the pulley 177.

When the drive motor built in the elevating base 175 is driven, the power is transmitted to the pulley 176 through the belt 178 from the pulley 177, so that the elevating base 174 can make an elevating operation shown by an arrow I.

Further, the upper portion of the elevating base 174 is connected to the turning mast 125 and also provided with the joint portion 22 for receiving a laser beam.

The laser beam received from the joint portion 22 is passed through an optical fiber cable 179 and is guided to a reflection mirror 181 of a mirror case 180 located on the upper portion of the elevating base 174. Then, an optical path is changed in its direction at a right angle by the reflection mirror 181 and is again changed at a right angle by the reflection mirror 153. Thereafter, the optical path arrives at the working surface through the collective lens 162.

Next, the following is a description on an operation of the working head of this eleventh embodiment.

In each of the positions 'd', 'e', 'f', 'g' and 'h' of the working head of FIG. 13B, the nozzle angle is adjusted by the drive motor built in the rotary base 150. In this time, a relative distance between the working target portion and the expansible nozzle 154 is variable, and for this reason, the drive motor built in the nozzle attachment base 152 is driven, and hence, a distance of the collective lens 162 is changed so that the laser beam is converged into the working surface. In this embodiment, the change of the optical path of the laser beam is shown by the symbol J in FIG. 14.

Moreover, a working range per batch is set by the horizontal operation by the drive motor built in the horizontal base 168 and the elevating operation by the drive motor built in the elevating base 175.

[Twelfth Embodiment]

Figure 15:
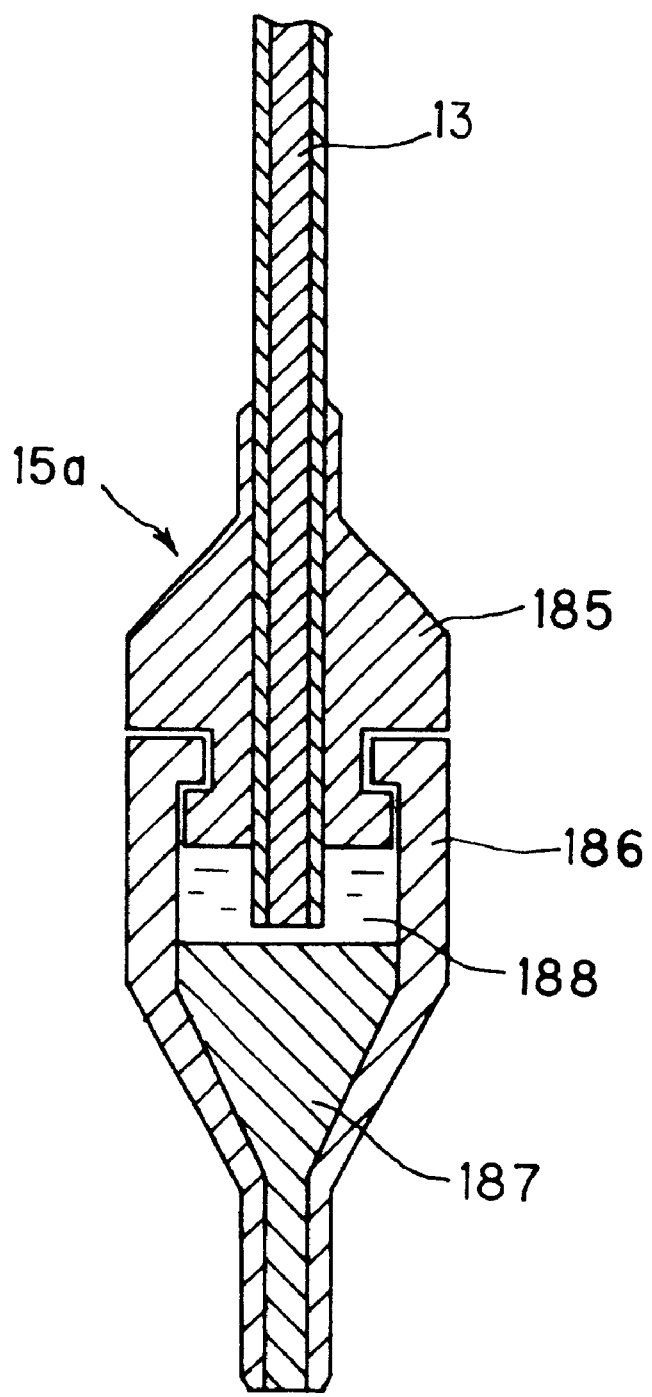
FIG. 15 is a cross sectional view showing an optical fiber connector plug of an underwater maintenance and repair apparatus according to a twelfth embodiment of the present invention.
Figure 16:
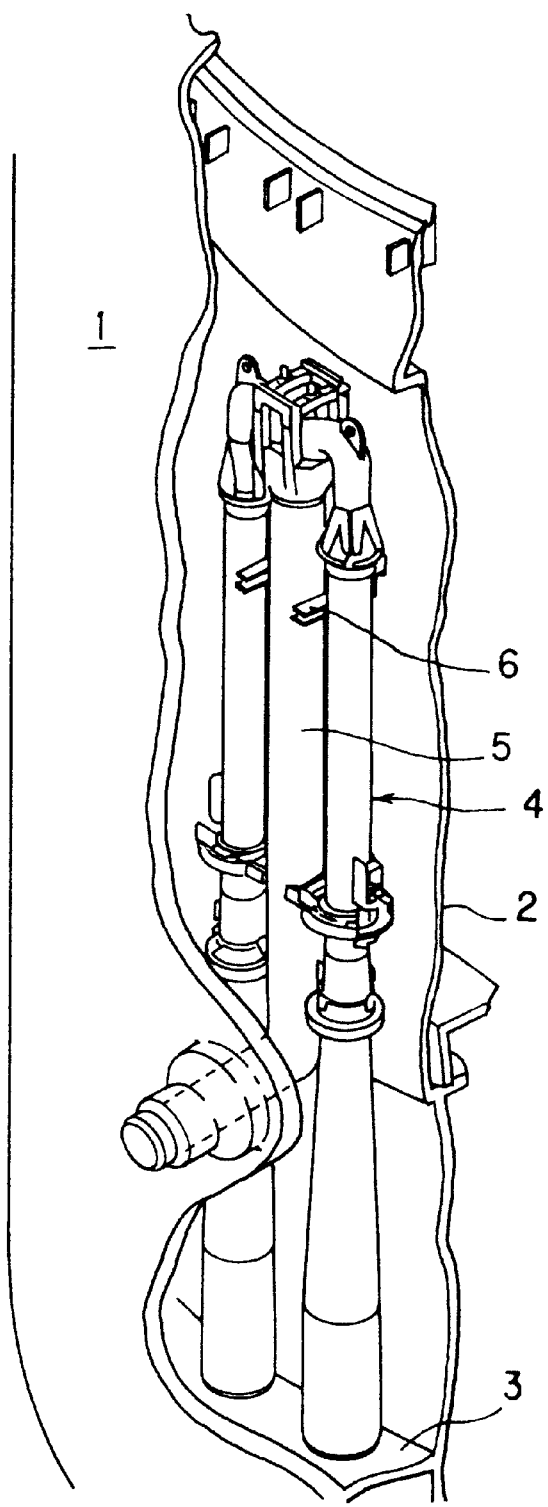
FIG. 16 is a perspective view showing a jet pump located in a reactor pressure vessel.

FIG. 15 is a cross sectional view showing an optical fiber connector plug of an underwater maintenance and repair apparatus according to a twelfth embodiment of the present invention.

As shown in FIG. 15, an optical fiber connector plug 15a of this twelfth embodiment is composed of an optical fiber cable 13, a first optical fiber case 185, a second optical fiber case 186, and a second optical fiber case 187. More specifically, the first optical fiber case 185 is fixed to the outer periphery of the distal end of the optical fiber cable 13, and the second optical fiber case 187 fixed in the second optical fiber case 186.

The optical fiber cable 13 and the second optical fiber case 186 are arranged so as to mechanically and closely abut against each other, and boundary therebetween is water 188. The first optical fiber case 185 and the second optical fiber case 186 of the optical fiber connector plug 15a have a fitting structure and constitute a rotary plug. Further, these cases have a structure capable of being rotated to a circumferential direction although they are fixed so as not to be moved in the axial direction.

Therefore, in a state that the optical fiber connector plug 15a is jointed and fixed to the optical fiber connector receptacle 16 of the working head 12, when a twisting motion is generated in the optical fiber cable 13, the optical fiber 13 and the first optical fiber case 185 are relatively rotated to a direction of reducing the generated twisting motion.

As described above, according to this twelfth embodiment, even if a positional change of the working head 12 is generated, a twist applied to the optical fiber cable 13 is reduced. Therefore, it is possible to prevent a breaking of the optical fiber cable 13.

As will be evident from the above description, according to the present invention, it is possible to independently handle the working head, the cable or hose connected to the working head, and the optical fiber cable. Therefore, according to the present invention, it is possible to improve reliability of the operation and to greatly reducing the working time for attaching the working head to the working position before carrying out the working.

In the described embodiment, although the present invention is limited to the underwater work in the reactor, it is applicable to a general underwater work. For example, the present invention is applicable to various tanks such as a storage tank such as a drinking tank for factory and home and a fire protection water tank, a wastewater or rainwater tank, a sewage treatment facility tank, and storage and process tank for beverage such as sake and fruit juice, chemical substances such as oil and medicine.

Further, the present invention is applicable to repair for ship and submarine in the ocean. In particular, it is possible to carry out maintenance and repair with respect to the entire system including a tank during movement and sailing.

INDUSTRIAL APPLICABILITY

According to the present invention, it is possible to achieve surface modification, surface working and decontamination with respect to an underwater and complicate and narrow working target portion in a tank or the like, without breaking an optical fiber cable of underwater maintenance and repair apparatus. Further, even if the system is moving, it is possible to achieve maintenance and repair work during movement.

What is claimed is:

1. An underwater maintenance and repair apparatus, characterized by including:
    a laser oscillator for generating a laser beam;
    a working head movably attached to a portion in a vicinity of a working target portion in the underwater, and adapted to scan the laser beam to the working target portion;
    an optical fiber cable for optically connecting the working head to the laser oscillator; and
    a joint mechanism arranged on a connective portion of the optical fiber cable and the working head to be separable through a remote control operation,
    said working head irradiating the laser beam to a surface of the working target portion so as to achieve surface modification, surface working and decontamination.

2. The underwater maintenance and repair apparatus according to claim 1, wherein the joint mechanism is composed of one of an electromagnet attached to the working head and a ferromagnetic body, and one of a ferromagnetic body having a magnetic property reverse to that of the working head attached to the distal end of the optical fiber cable and an electromagnet.

3. The underwater maintenance and repair apparatus according to claim 1, wherein the joint mechanism is composed of a removable unit attached with an optical fiber cable and a joint unit located on the working head side, which are separable from each other, and the joint unit is provided with a removable mechanism, which is jointed with the removable unit.

4. The underwater maintenance and repair apparatus according to claim 3, wherein the removable unit has an expandable and shrinkable float received in a protective container, an air is supplied to the float through an air hose so that the float is swell, and a buoyant force is generated in the float so that the removable unit is retrieved.

5. The underwater maintenance and repair apparatus according to claim 1, wherein the joint mechanism includes an optical fiber connector receptacle attached to the working head, an optical fiber connector attached to the optical fiber cable, and a suction mechanism for sucking the optical fiber connector and the optical fiber connector receptacle so as to be fitted each other.

6. The underwater maintenance and repair apparatus according to claim 1, wherein one end of a guide wire is connected to the distal end of the optical fiber cable, and another other end of the guide wire is connected to a guide wire winding machine located above a reactor pool via a joint mechanism attached to the working head, and the optical fiber cable is connected to and released from the working head by winding up the guide wire by the guide wire winding machine.

7. The underwater maintenance and repair apparatus according to claim 1, wherein an optical fiber guide mechanism is located in a reactor, said optical fiber guide mechanism including a cylindrical bellows, which passes the optical fiber cable so as to supply the optical fiber cable to a joint mechanism, and a manipulator attached, at a side thereof, with the bellows.

8. The underwater maintenance and repair apparatus according to claim 1, wherein the working head, which joints the optical fiber cable using a joint mechanism and carries out a working while scanning the working target portion, is attached to a working head attachment, said working head attachment including a fixing mechanism for fixing the working head to an in-core structure and a slid mechanism sliding horizontally and longitudinally together with the working head.

9. The underwater maintenance and repair apparatus according to claim 8, wherein said working head attachment further includes an expansible mechanism for fixture pressed and fixed between the in-core structures and a slid mechanism for sliding and positioning the working head.

10. The underwater maintenance and repair apparatus according to claim 8, wherein said working head attachment further includes a suction fan to be fixed to the in-core structure and a drive mechanism for moving and positioning the working head.

11. The underwater maintenance and repair apparatus according to claim 8, wherein said working head attachment further includes a suction mechanism to be sucked to an in-core structure, a manipulator, which is provided with the working head and is variable in attitude and position thereof, and a relay optical fiber cable interposed between internal joints of the manipulator.

12. The underwater maintenance and repair apparatus according to claim 1, wherein a working unit having a structure of a manipulator is attached to a turning track movable to a circumferential direction of reactor and the working head is attached to the distal end of the working unit and is positioned to the working target portion according to a position control by means of remote control.

13. The underwater maintenance and repair apparatus according to claim 1, wherein a second optical fiber cable is arranged on the distal end portion of the optical fiber cable so that the optical fiber cable and the second optical fiber cable are relatively rotatable through a rotary plug.

14. An underwater maintenance and repair method, comprising the steps of:

independently fixing a working head to a portion in a vicinity of a working target portion;

jointing an optical fiber cable to the working head using a joint mechanism through a remote control operation;

guiding a laser beam emitted from a laser oscillator through the optical fiber cable, and irradiating the laser beam from the working head to a surface of the working target portion while carrying out a scanning operation to achieve surface modification, surface working and decontamination.

* * * * *